United States Patent
Ugai et al.

(10) Patent No.: US 6,873,983 B2
(45) Date of Patent: Mar. 29, 2005

(54) INFORMATION USE FREQUENCY PREDICTION PROGRAM, INFORMATION USE FREQUENCY PREDICTION METHOD, AND INFORMATION USE FREQUENCY PREDICTION APPARATUS

(75) Inventors: Takanori Ugai, Kawasaki (JP); Kazuo Misue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 443 days.

(21) Appl. No.: 10/050,862

(22) Filed: Jan. 18, 2002

(65) Prior Publication Data

US 2002/0184212 A1 Dec. 5, 2002

(30) Foreign Application Priority Data

May 22, 2001 (JP) ........................................ 2001-153116

(51) Int. Cl.$^7$ .............................................. G06F 17/30
(52) U.S. Cl. ...................... 707/6; 707/3; 707/4; 707/5; 381/36; 381/37; 381/29
(58) Field of Search ............................... 707/3, 4, 5–6, 707/1; 381/29–43, 51–53

(56) References Cited

U.S. PATENT DOCUMENTS 5,027,404 A * 6/1991 Taguchi ...................... 704/221
6,463,428 B1 * 10/2002 Lee et al. ...................... 707/3

* cited by examiner

Primary Examiner—Charles Rones
Assistant Examiner—Belix M. Ortiz
(74) Attorney, Agent, or Firm—Staas & Halsey LLP.

(57) ABSTRACT

The information use frequency prediction device is provided with a comparison section for shifting a second time series data related to the use frequency of a first keyword, sequentially on the time base in a unit of predetermined time, based on a first time series data related to the use frequency of a second keyword input while searching over the Internet, and calculating a correlation coefficient between the first time series data and the second time series data, for each unit of predetermined time. Moreover, a prediction section specifies a pair of the first time series data and the second time series data, corresponding to the correlation coefficient having the highest value, of a plurality of correlation coefficients calculated by the comparison section and for predicting the use frequency of the first time series data constituting the pair, based on the second time series data.

15 Claims, 23 Drawing Sheets

FIG.5

| FIRST TIME SERIES DATA | SECOND TIME SERIES DATA | CORRELATION COEFFICIENT | TIME DIFFERENCE |
|---|---|---|---|
| CAMERA | NEW YEAR CARD | 0.1 | −T |
| .... | | | |
| CAMERA | NEW YEAR CARD | 0.16 | 0 |
| .... | | | |
| CAMERA | NEW YEAR CARD | 0.68 | +9 |
| .... | | | |
| CAMERA | NEW YEAR CARD | 0.2 | +T |
| .... | | | |
| CAMERA | RADIO | 0.05 | −T |
| .... | | | |

FIG.16

| F | | | | |
|---|---|---|---|---|
| FIRST TIME SERIES DATA | SECOND TIME SERIES DATA | CORRELATION COEFFICIENT | TIME DIFFERENCE | EXPANSION RATIO |
| CAMERA | NEW YEAR CARD | 0.1 | $-T$ | 50% |
| .... | | | | |
| CAMERA | NEW YEAR CARD | 0.16 | $-T$ | 100% |
| .... | | | | |
| CAMERA | NEW YEAR CARD | 0.68 | $-T$ | 200% |
| .... | | | | |
| CAMERA | NEW YEAR CARD | 0.2 | $-T+1$ | 50% |
| .... | | | | |

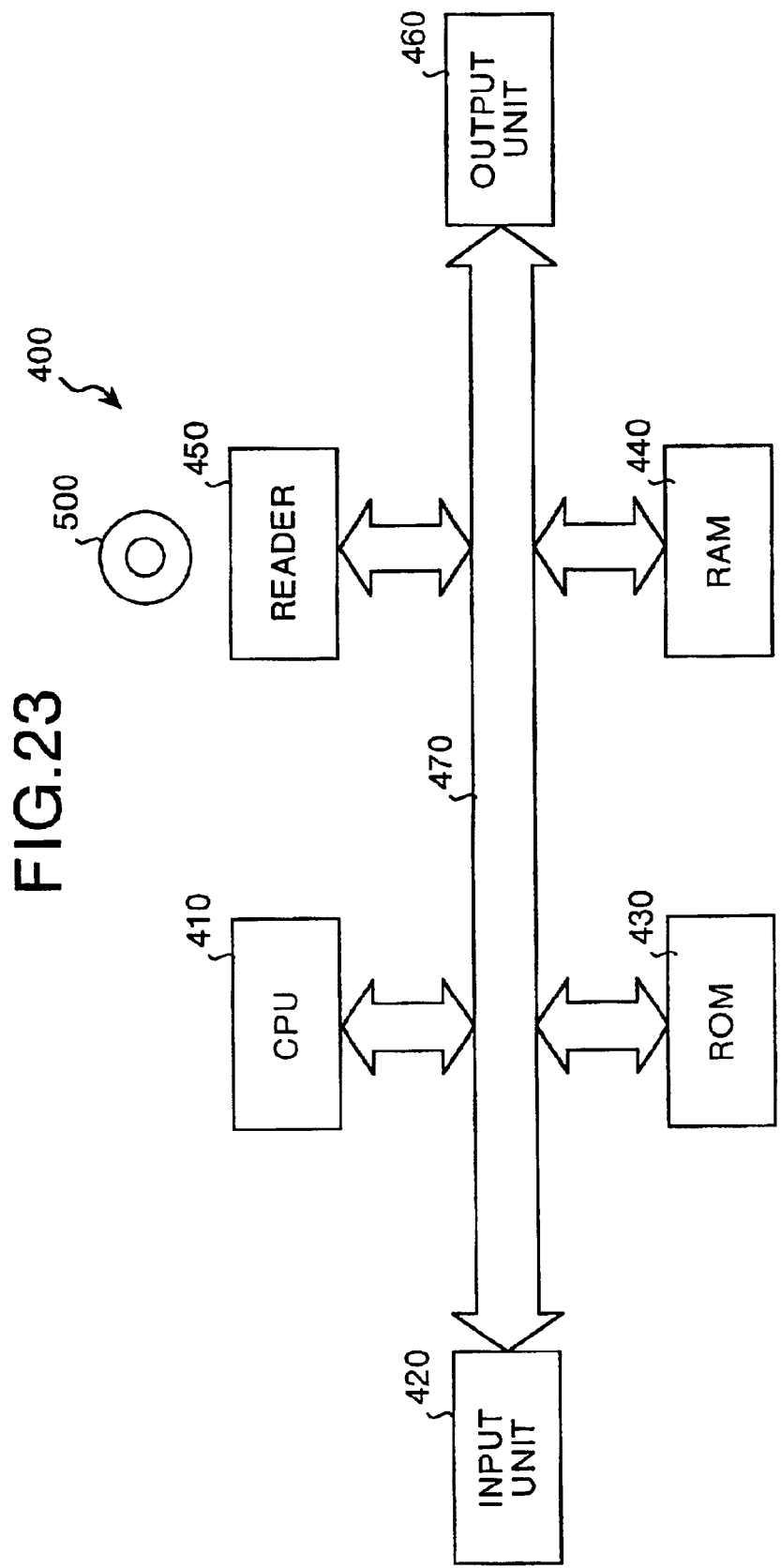

US 6,873,983 B2

INFORMATION USE FREQUENCY PREDICTION PROGRAM, INFORMATION USE FREQUENCY PREDICTION METHOD, AND INFORMATION USE FREQUENCY PREDICTION APPARATUS

BACKGROUND OF THE INVENTION (1) Field of the Invention

The present invention relates to an information use frequency prediction program, an information use frequency prediction apparatus and an information use frequency prediction method used for predicting use frequency of various information (search key word or the like), for example, on the Internet. More specifically, this invention relates to an information use frequency prediction program, an information use frequency prediction apparatus and an information use frequency prediction method, which can increase the prediction accuracy.

(2) Description of Related Art

On the Internet, heretofore, it is possible by a keyword input to search information including a keyword with a search engine. The keyword input herein often reflects the trend and the current of the times. Therefore, many companies study a method of effectively using keywords as the search log data. For example, companies apply the time series analysis method to the search log to predict the future use frequency of keywords, and use this prediction result for their business activities.

Recently, lots of electronic commercial transaction sites have been opened on the Internet, to positively perform sales of goods. In these electronic commercial transaction sites, purchase control and stock control are important factors linked directly with the sales. For example, in the case where well selling goods one week later can be predicted, precise purchase and less wasteful stock control can be performed, which are directly linked with the sales.

Moreover, in many electronic commercial transaction sites, there is provided a search service of goods by a keyword input, and it is considered that well selling goods are predicted by the time series analysis of the search log data (keyword). For example, in the case of a keyword "camera", the use frequency in the past in the search log data is subjected to the time series analysis, to thereby predict the future trend from the past trend.

As described above, with the method of predicting the use frequency of keywords by the time series analysis, high accuracy cannot be expected. That is to say, keywords on the Internet are very sensitive to the current of the world, such as the trend and current of the times. Accordingly, with regard to the same keyword, it can be considered that the accuracy is low, since the past trend not always applies to the future trend.

BRIEF SUMMARY OF THE INVENTION

It is an object of the present invention to provide an information use frequency prediction program, an information use frequency prediction apparatus and an information use frequency prediction method, which can predict the use frequency of information at high accuracy.

The information use frequency prediction program according to one aspect of the present invention causes a computer to function as: a temporal operation unit which performs temporal operation in a unit of predetermined time, sequentially, with respect to the relative relation between a first pattern representing a temporal change related to use frequency of first time series information and a second pattern representing a temporal change related to use frequency of second time series information; a correlation coefficient calculation unit which calculates a correlation coefficient between the first time series information and the second time series information, for each unit of the predetermined time; a pair specifying unit which specifies a pair of the first time series information and the second time series information, corresponding to the correlation coefficient having the highest value, of a plurality of correlation coefficients calculated by the correlation coefficient calculation unit; and a prediction unit which predicts use frequency of the first time series information constituting the pair, based on the second pattern corresponding to the pair.

The information use frequency prediction apparatus according to another aspect of the present invention comprises: a temporal operation unit which performs temporal operation in a unit of predetermined time, sequentially, with respect to the relative relation between a first pattern representing a temporal change related to use frequency of first time series information and a second pattern representing a temporal change related to use frequency of second time series information; a correlation coefficient calculation unit which calculates a correlation coefficient between the first time series information and the second time series information, for each unit of the predetermined time; a pair specifying unit which specifies a pair of the first time series information and the second time series information, corresponding to the correlation coefficient having the highest value, of a plurality of correlation coefficients calculated by the correlation coefficient calculation unit; and a prediction unit which predicts use frequency of the first time series information constituting the pair, based on the second pattern corresponding to the pair.

The information use frequency prediction method according to still another aspect of the present invention comprises: a temporal operation step of performing temporal operation in a unit of predetermined time, sequentially, with respect to the relative relation between a first pattern representing a temporal change related to use frequency of first time series information and a second pattern representing a temporal change related to use frequency of second time series information; a correlation coefficient calculation step of calculating a correlation coefficient between the first time series information and the second time series information, for each unit of the predetermined time; a pair specifying step of specifying a pair of the first time series information and the second time series information, corresponding to the correlation coefficient having the highest value, of a plurality of correlation coefficients calculated by the correlation coefficient calculation step; and a prediction step of predicting use frequency of the first time series information constituting the pair, based on the second pattern corresponding to the pair.

According to above-mentioned aspects, temporal operation is performed in a unit of predetermined time, sequentially, with respect to the relative relation between the first pattern corresponding to the first time series information and the second pattern corresponding to the second time series information, a correlation coefficient between the first time series information and the second time series information is calculated, for each unit of the predetermined time, and use frequency of the first time series information constituting the pair is predicted based on the second pattern corresponding to the pair of the first time series information and the second time series information, corresponding to the correlation coefficient having the highest value. Therefore, the use frequency of information can be predicted at high accuracy, compared to the case where prediction is performed based on one time series information, as in the conventional case.

Other objects and features of this invention will become apparent from the following description with reference to the accompanying drawings.

BRIEF DESCRIPTION OF THE DRAWINGS

FIG. 5 is a diagram showing one example of the comparison result data C shown in FIG. 1.

FIG. 16 is a diagram showing one example of the comparison result data F shown in FIG. 15.

FIG. 23 is a block diagram showing the construction of a variation example of the first to third embodiment.

DETAILED DESCRIPTION OF THE INVENTION

Embodiments of the information use frequency prediction program, the information use frequency prediction apparatus and the information use frequency prediction method according to the present invention will now be described with reference to the accompanying drawings.

In the embodiments explained below, attention is paid to the point that, for example, an earthquake has arisen, and a keyword "earthquake" has been often used on the Internet, then after a while, another keyword "insurance" which has a deep correlation with this keyword is used in the same pattern as the use frequency of the keyword "earthquake". That is, the first to third embodiments are characterized in that use frequency of a certain keyword is predicted, using the time series data of another keyword having a deep correlation with this keyword.

Figure 1:
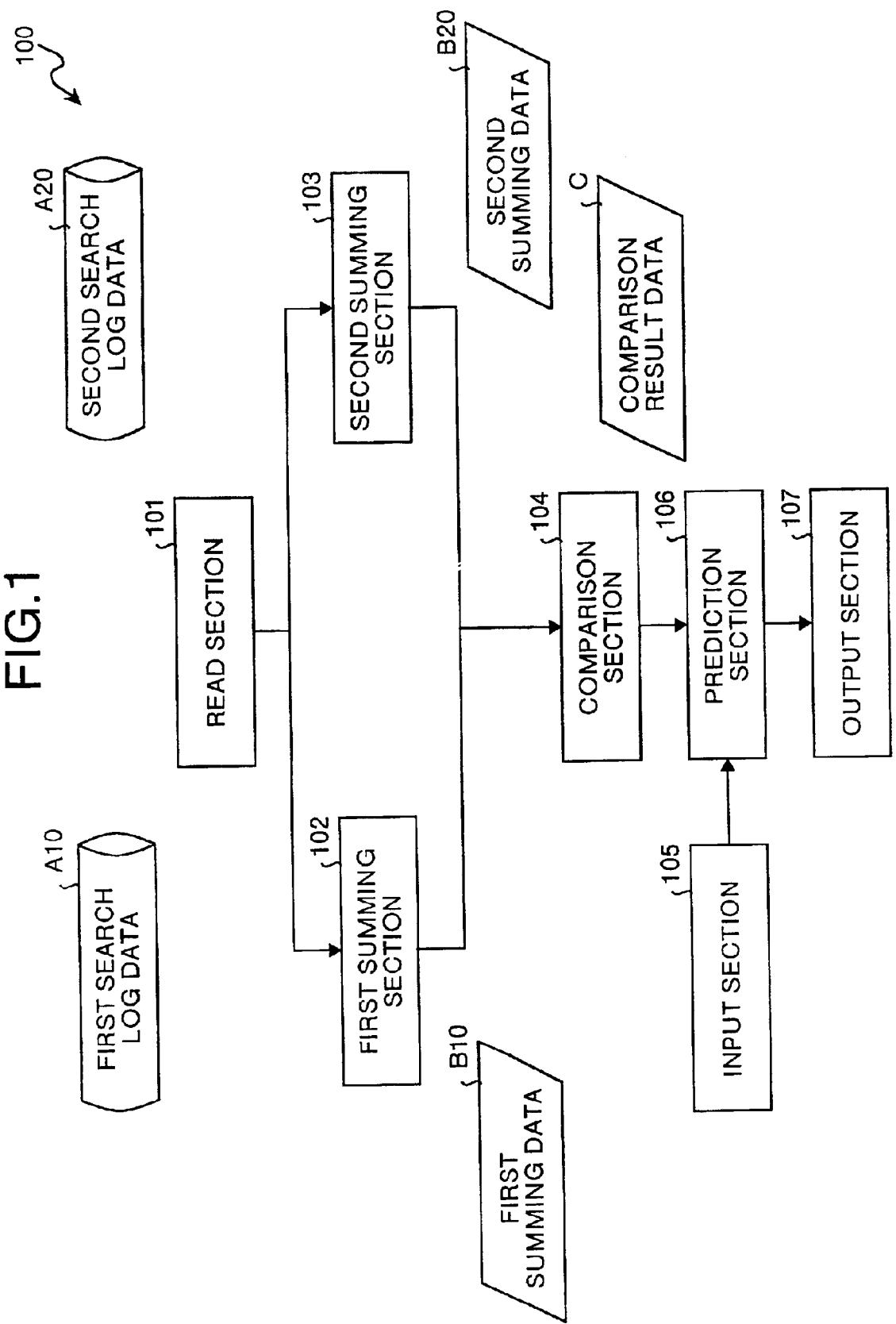
FIG. 1 is a block diagram showing the construction of a first embodiment of the present invention.

FIG. 1 is a block diagram showing the construction of a first embodiment of the present invention. In the information use frequency prediction apparatus 100 shown in this figure, a read section 101 comprises a function of reading the first search log data A10 and the second search log data A20. The first search log data A10 is search log data of a first search engine (not shown) for searching the information on the Internet, for example, by a keyword input.

Figure 2:
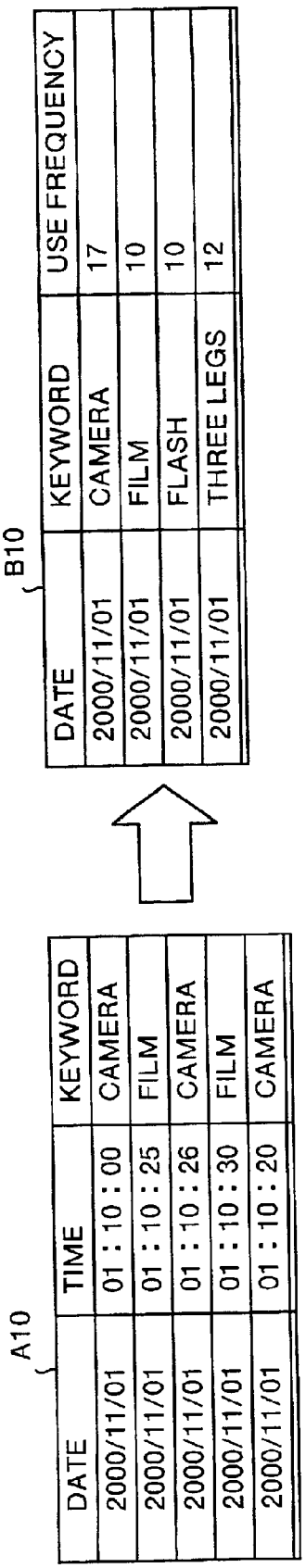
FIG. 2 is a diagram showing one example of first search log data A10 and first summing up data B10, shown in FIG. 1.

Specifically, as shown in FIG. 2, the first search log data A10 is composed of time series data including "date" and "time" when the search keyword is input, and the input "keyword". In the example shown in this figure, it is indicated that a keyword "camera" was input to the first search engine at 01:10:00 on Nov. 01, 2000 and the information on the Internet was searched, using the "camera" as a key in this first search engine.

Figure 3:
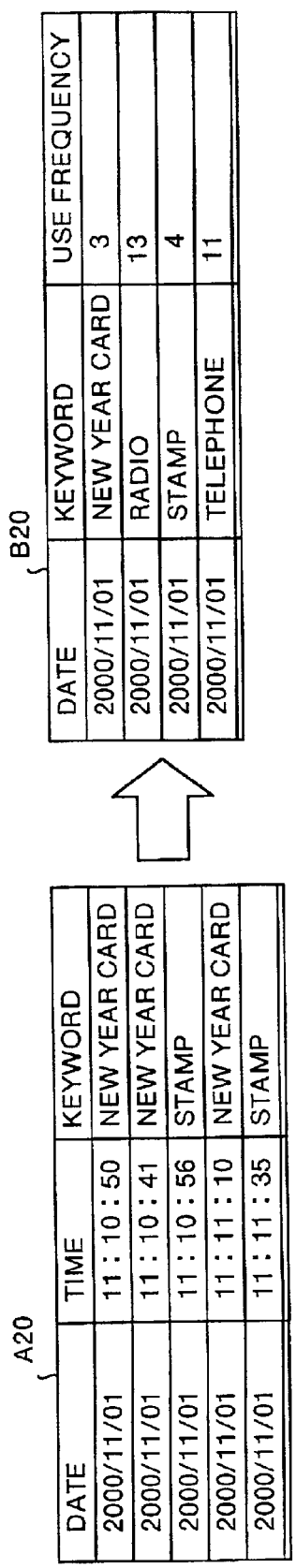
FIG. 3 is a diagram showing one example of second search log data A20 and second summing up data B20, shown in FIG. 1.

Returning to FIG. 1, the second search log data A20 is search log data of a second search engine (not shown) for searching the information on the Internet, for example, by a keyword input. Specifically, as shown in FIG. 3, the second search log data A20 is composed of time series data including "date" and "time" when the search keyword is input, and the input "keyword".

In the example shown in this figure, it is indicated that a keyword "New Year card" was input to the second search engine at 11:10:50 on Nov. 11, 2000 and the information on the Internet was searched, using the "New Year card" as a key in this second search engine.

Returning to FIG. 1, a first summing section 102 sums up the first search log data A10 read by the read section 101, and outputs the first summing data B10 as the summing result. As shown in FIG. 2, this first summing data B10 is data representing the use frequency (number of times) of the "keyword" for each "date". In the example shown in this figure, it is seen that the keyword "camera" was used 17 times on Nov. 11, 2000.

Returning to FIG. 1, a second summing section 103 sums up the second search log data A20 read by the read section 101, and outputs the second summing data B20 as the summing result. As shown in FIG. 3, this second summing data B20 is data representing the use frequency (number of times) of the "keyword" for each "date". In the example shown in this figure, it is seen that the keyword "New Year card" was used three times on Nov. 11, 2000.

Figure 4:
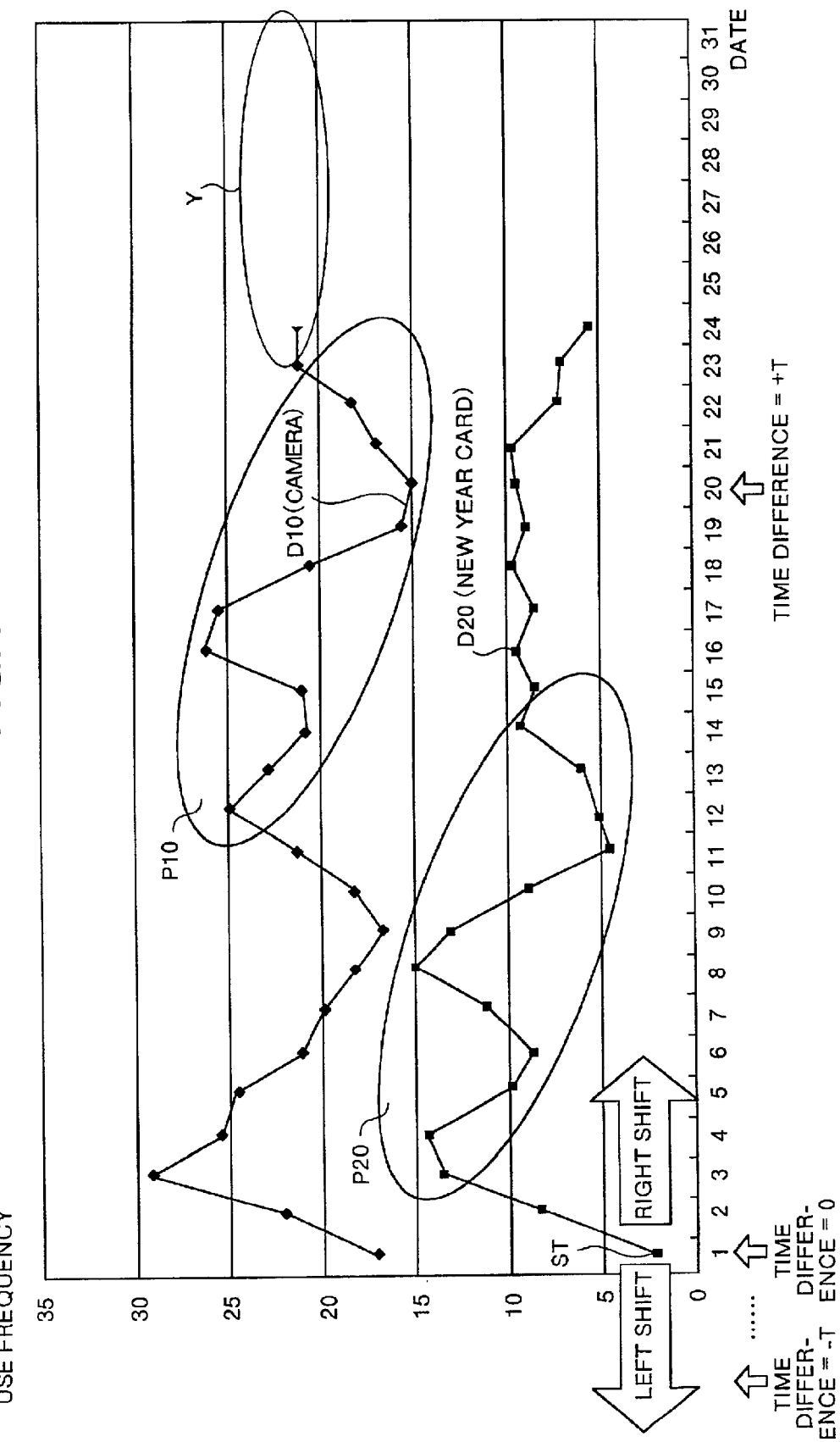
FIG. 4 is a diagram showing one example of first time series data D10 and second time series data D20 in the first embodiment.

With reference to FIG. 4, description will be made of a case where a certain keyword of the above-described first summing data B10 (see FIG. 2), and a certain keyword of the second summing data B20 (see FIG. 3) are respectively expressed in the time series. In FIG. 4, the first time series data D10 represents changes in the use frequency for each date (December 1st to December 24th) related to the keyword "camera" in the first summing data B10 shown in FIG. 2.

On the other hand, the second time series data D20 represents changes in the use frequency for each date (December 1st to December 24th) related to the keyword "New Year card" in the second summing data B20 shown in FIG. 3. As is seen from this figure, the use frequency of the keywords used on the Internet changes time wise. In the first summing data B10, the first time series data exists by the number of the keyword.

Similarly, the second time series data exists by the number of the keyword in the second summing data B20. In the example shown in this figure, it is seen that the pattern of the ellipse in the first time series data D10 and the pattern of the ellipse in the second time series data D20 are approximate to each other.

Returning to FIG. 1, a comparison section 104 sequentially compares one of the first time series data contained in the first summing data B10 and one of the second time series data contained in the second summing data B20, to thereby determine the correlation coefficient between these data. If the correlation coefficient is high, it means that the changes with lapse of time (pattern) of the both data are approximate to each other. On the other hand, if the correlation coefficient is low, it means that the changes with lapse of time (pattern) of the both data are quite different.

Moreover, the comparison section 104 does not simply determine a correlation coefficient between the first time series data and the second time series, but as shown in FIG. 4, determines a correlation coefficient in the case where the second time series data D20 is shifted to the left side in this figure by T, based on the first time series data D10. In the case where the starting point ST of the second time series data D20 is located at −T, the time difference (shift amount) between the second time series data D20 and the first time series data D10 is designated as −T.

The comparison section 104 determines the correlation coefficient between the second time series data D20 and the first time series data D10, in the state with the second time series data D20 being shifted by 1 to the right. Thereafter, the comparison section 104 sequentially determines the correlation coefficient by shifting the second time series data D20 to the right by 1.

The comparison section 104 then shifts the second time series data D20 to the right until the starting point ST of the second time series data D20 is located at +T (in this figure, 20th), to thereby determine the correlation coefficient. In this case, the time difference between the first time series data D10 and the second time series data D20 is +T. That is to say, in one combination (the first time series data D10 and the second time series data D20), the correlation coefficient is determined every time the second time series data D20 is shifted by 1 in the range of from −T to +T.

The comparison section 104 performs the 1 shift operation from −T to +T and calculates the correlation coefficient, with regard to all the combinations of the first time series data D10 and the second time series data D20. Moreover, the comparison section 104 shown in FIG. 1 outputs the comparison result data C shown in FIG. 5 to a prediction section 106 as the above-described comparison result.

This comparison result data C is composed of the "first time series data", the second time series data", the "correlation coefficient" and the "time difference". The "first time series data" is time series data related to the keyword contained in the first summing data B10 (see FIG. 2). The "first time series data" in the first record shown in this figure is time series data related to "camera" as the keyword.

The "second time series data" is time series data related to the keyword contained in the second summing data B20 (see FIG. 3). The "second time series data" shown in this figure is time series data related to "New Year card" as the keyword.

The "correlation coefficient" is a correlation coefficient between the "first time series data" and the "second time series data". The "time difference" is a shift amount of the "second time series data" with respect to the "first time series data". When a minus sign is attached to the "time difference", it means that the "second time series data" is shifted to the left (see FIG. 4).

Moreover, when the "time difference" is 0, it means that the shift amount is 0 (see FIG. 4). When a plus sign is attached to the "time difference", it means that the "second time series data" is shifted to the right (see FIG. 4), with respect to the "first time series data".

Returning to FIG. 1, an input section 105 is a keyboard or the like, for inputting the keyword to be predicted (hereinafter, referred to as "keyword to be predicted") and the predicted date. A prediction section 106 predicts use frequency related to the keyword to be predicted, based on the comparison result data C, using the keyword to be predicted and the predicted date from the input section 105 as a key.

In the example shown in FIG. 4, the prediction section 106 predicts the use frequency after December 25th (the portion of an ellipse Y). The details of the operation of this prediction section 106 will be described later. The output section 107 is a display, a printer or the like, and outputs the prediction result of the prediction section 106.

The operation in the first embodiment will be described with reference to the flowcharts shown in FIG. 7 to FIG. 9. In step SA1 shown in FIG. 7, the read section 101 reads the first search log data A10 (see FIG. 2) and the second search log data A20 (see FIG. 3), and outputs these data to the first summing section 102 and the second summing section 103.

In step SA2, the first summing section 102 and the second summing section 103 execute the summing processing. That is to say, the first summing section 102 sums up the first search log data A10 shown in FIG. 2, and stores the first summing data B10 in a memory (not shown) as the summing result. On the other hand, the second summing section 103 sums up the second search log data A20 shown in FIG. 3, and stores the second summing data B20 in a memory (not shown) as the summing result.

In step SA3, the comparison section 104 executes the comparison processing. That is to say, in step SB1 shown in FIG. 8, the comparison section 104 reads the first summing data B10 (see FIG. 2) from the memory (not shown) in the first summing section 102. In step SB2, the comparison section 104 reads the second summing data B20 (see FIG. 3) from the memory (not shown) in the second summing section 103.

In step SB3, the comparison section 104 judges whether the first time series data related to all the keywords has been obtained or not from the first summing data B10 (see FIG. 2), and in this case, this judgment result is assumed to be "No". In step SB4, the comparison section 104 obtains the first time series data D10 shown in FIG. 4, related to one keyword (for example, camera).

In step SB5, the comparison section 104 judges whether the second time series data related to all the keywords has been obtained or not from the second summing data B20 (see FIG. 3), and in this case, this judgment result is assumed to be "No". In step SB6, the comparison section 104 obtains the second time series data D20 shown in FIG. 4, related to one keyword (for example, New Year card).

In step SB7, the comparison section 104 shifts the second time series data D20 to the left by T. In step SB8, the comparison section 104 calculates the correlation coefficient of the second time series data D20 and the first time series data D10 in the shifted state, from the equation (1):

$$\rho_{xy} = \frac{1}{n} \times \frac{\sum_{i=1}^{n}(x_i - \mu_x)(y_i - \mu_y)}{\sigma_x \times \sigma_y} \quad (1)$$

In the equation (1), $\rho_{xy}$ denotes a correlation coefficient between the first time series data and the second time series data. "n" denotes the number of data overlapping time wise, of a plurality of data constituting the first time series data and a plurality of data constituting the second time series data. The plurality of data overlapping on the second time series data time wise is expressed as $x_1$ to $x_n$. On the other hand, the plurality of data overlapping on the first time series data time wise is expressed as $y_1$ to $y_n$.

Therefore, accurately, the correlation coefficient $\rho_{xy}$ is a correlation coefficient between data $x_1$ to $x_n$ and data $y_1$ to $y_n$. Also, $\mu_x$ in the equation (1) denotes an average value of the data $x_1$ to $x_n$, and is expressed by the equation (2). On the other hand, $\mu_y$ in the equation (1) denotes an average value of the data $y_1$ to $y_n$, and is expressed by the equation (3).

$$\mu_x = \frac{\sum_{i=1}^{n} x_i}{n} \quad (2)$$

$$\mu_y = \frac{\sum_{i=1}^{n} y_i}{n} \quad (3)$$

Moreover, $\sigma_x$ in the equation (1) is a standard deviation of the data $x_1$ to $x_n$, and is expressed by the equation (4). On the other hand, $\sigma_y$ in the equation (1) is a standard deviation of the data $y_1$ to $y_n$, and is expressed by the equation (5).

$$\sigma_x = \sqrt{\frac{n\sum_{i=1}^{n}(x_i)^2 - \left(\sum_{i=1}^{n} x_1\right)^2}{n(n-1)}} \quad (4)$$

$$\sigma_y = \sqrt{\frac{n\sum_{i=1}^{n}(y_i)^2 - \left(\sum_{i=1}^{n} y_1\right)^2}{n(n-1)}} \quad (5)$$

In the state with the second time series data D20 shown in FIG. 4 being shifted to the left by T, for example "0.1" is determined as the correlation coefficient between the first time series data D10 (camera) and the second time series data D20 (New Year card). The comparison section 104 prepares the comparison result data C (the first time series data (camera), the second time series data (New Year card), correlation coefficient=0.1, time difference=−T), as the comparison result.

In step SB9, the comparison section 104 judges whether or not the second time series data is shifted to the right by T from the position of the time difference 0 shown in FIG. 4, that is, the time difference is +T or not, and in this case, the judgment result is assumed to be "No". In step SB10, the comparison section 104 shifts the second time series data (in this case, the second time series data D20: see FIG. 4) to the right by 1.

Thereafter, step SB8 to step SB10 are repeated. As a result, the second time series data D20 is shifted to the right by 1 with respect to the first time series data D10, and the correlation coefficient is determined corresponding to the time difference (see FIG. 5). That is to say, a correlation coefficient related to the combination of the shift frequency of the first time series data (camera) in the first summing data B10 shown in FIG. 2 and the second time series data (New Year card) in the second summing data B20 shown in FIG. 3 is determined corresponding to the time difference.

Figure 6:
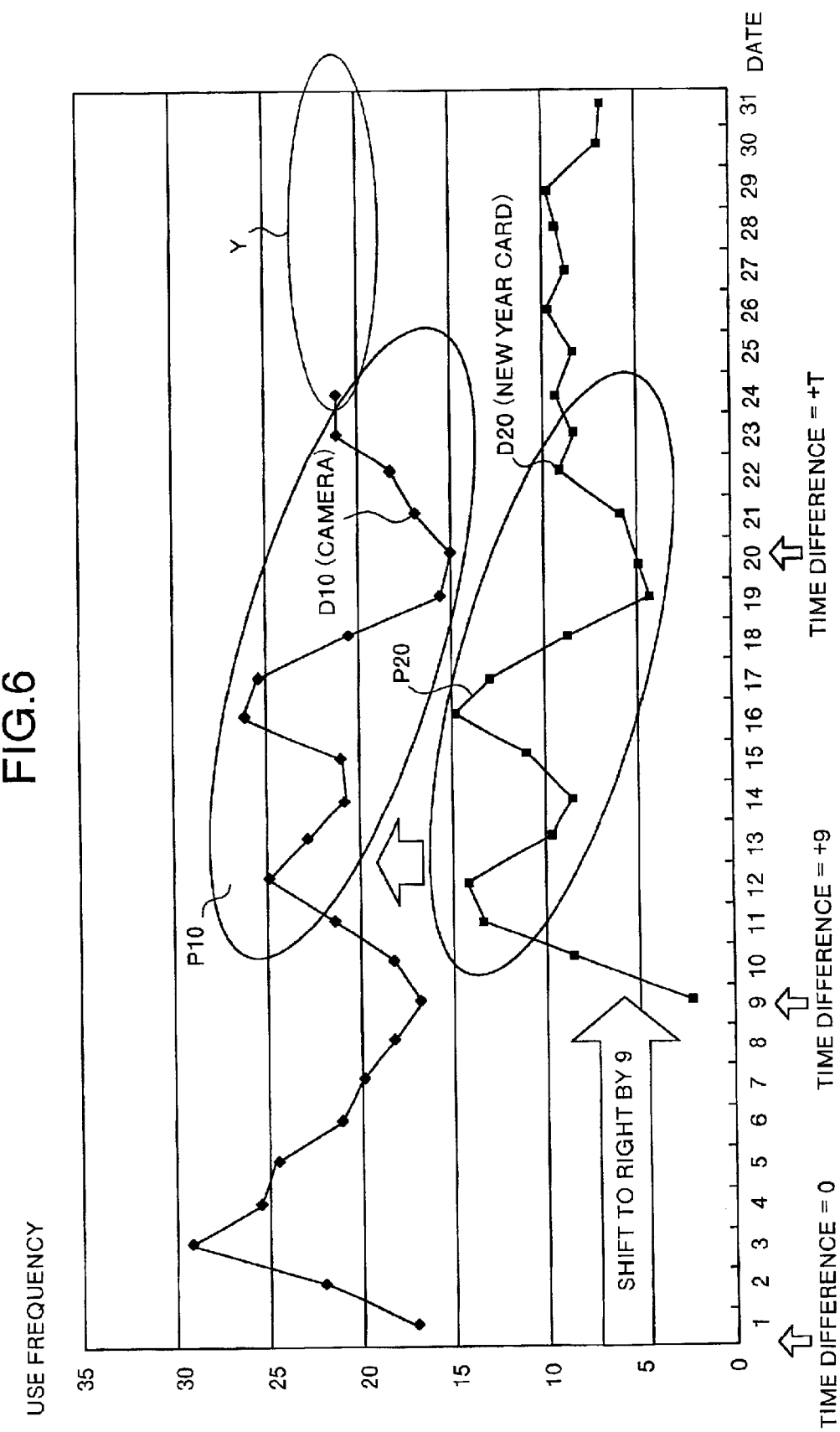
FIG. 6 is a diagram for explaining right shift in the first embodiment.

The first time series data D10 (camera) in the case where the second time series data D20 (New Year card) is shifted to the right by 9 is shown in FIG. 6. As seen from this figure, the pattern of the ellipse P10 substantially coincides time wise with the pattern of the ellipse P20. The correlation coefficient in this case is designated as, for example, 0.68, which is a very high value.

When the judgment result in step SB9 becomes "Yes", then in step SB5, the comparison section 104 judges whether the second time series data related to all keywords is obtained or not from the second summing data B20 (see FIG. 3), and in this case, the judgment result is assumed to be "No". In step SB6, the comparison section 104 obtains the second time series data (not shown) related to the next keyword (for example, radio).

In step SB7, the comparison section 104 shifts the second time series data (radio) to the left by T. In step SB8, the comparison section 104 calculates a correlation coefficient of the second time series data (radio) and the first time series data (camera) in the shifted state, from the equation (1). Thereafter, the above-described operation is repeated. As a result, the second time series data (radio) is shifted to the right by 1 with respect to the first time series data D10 (camera), and the correlation coefficient is determined corresponding to the time difference.

When the judgment result in step SB9 becomes "Yes", the comparison section 104 assumes the judgment result to be "No", and repeats the step SB3 to step SB10.

When a correlation coefficient of the combination of the shift frequency, which is the combination of the first time series data related to all the keywords and the second time series data related to all the keywords, is obtained, the judgment result in step SB3 becomes "Yes". In step SB11, the comparison section 104 outputs the comparison result data C shown in FIG. 5 to the prediction section 106.

Figure 7:
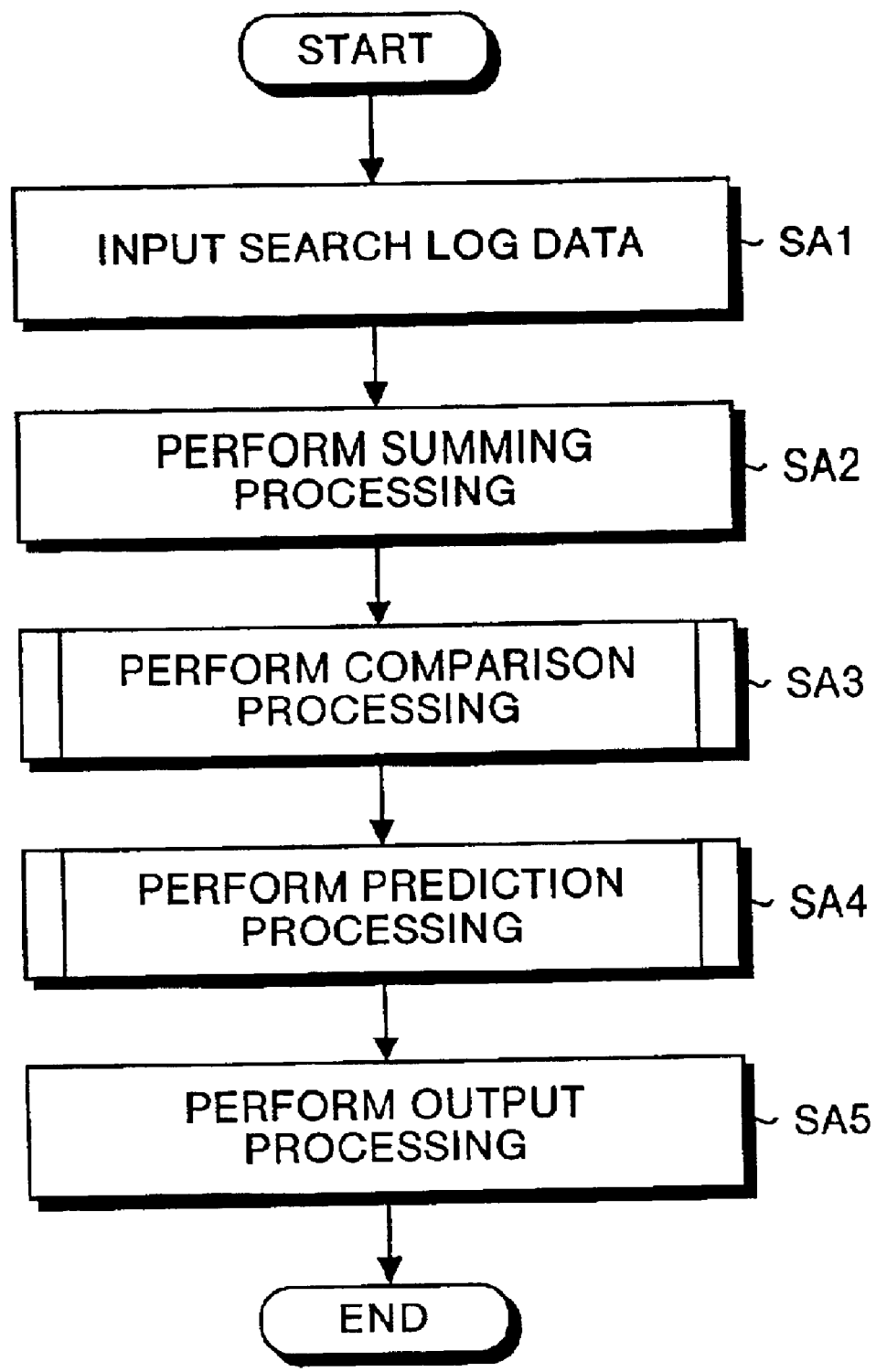
FIG. 7 is a flowchart for explaining the operation in the first embodiment.

In step SA4 shown in FIG. 7, the prediction section 106 executes the prediction processing based on the comparison result data C. Specifically, in step SC1 shown in FIG. 9, the user inputs the keyword to be predicted and the date, using the input section 105.

In this case, in order to predict the use frequency of the ellipse Y portion (keyword: camera) shown in FIG. 4, the user inputs "camera" as the keyword to be predicted and "December 25th" as the date. As a result, the use frequency after December 25th is predicted related to the first time series data D10 (camera).

In step SC2, the prediction section 106 reads the keyword K to be predicted (camera) and date D (December 25th) input in step SC1. In step SC3, the prediction section 106 obtains a keyword having the highest correlation coefficient as the reference keyword KW, from the comparison result data C shown in FIG. 5, using the keyword K to be predicted (camera) as a key.

In this case, it is assumed that the combination of the first time series data (camera), the second time series data (New Year card), correlation coefficient=0.68 and the time difference=+9 shown in FIG. 5 and FIG. 6 have the highest correlation coefficient. This combination is shown in the graph in FIG. 6.

Therefore, with this combination, the keyword K to be predicted is "camera", and the reference keyword KW is "New Year card", and based on the second time series data D20 shown in FIG. 6 corresponding to the reference keyword KW (New Year card), the use frequency related to the keyword K to be predicted (camera) after December 25th is predicted.

Specifically, in step SC4, the prediction section 106 shifts the second time series data D20 shown in FIG. 4 to the right by the time difference 9 as shown in FIG. 6. Moreover, the prediction section 106 shifts upwards the second time series data D20 shown in FIG. 6, so as to substantially agree with the first time series data D10. As a result, the state shown in FIG. 10 can be obtained.

Figure 10:
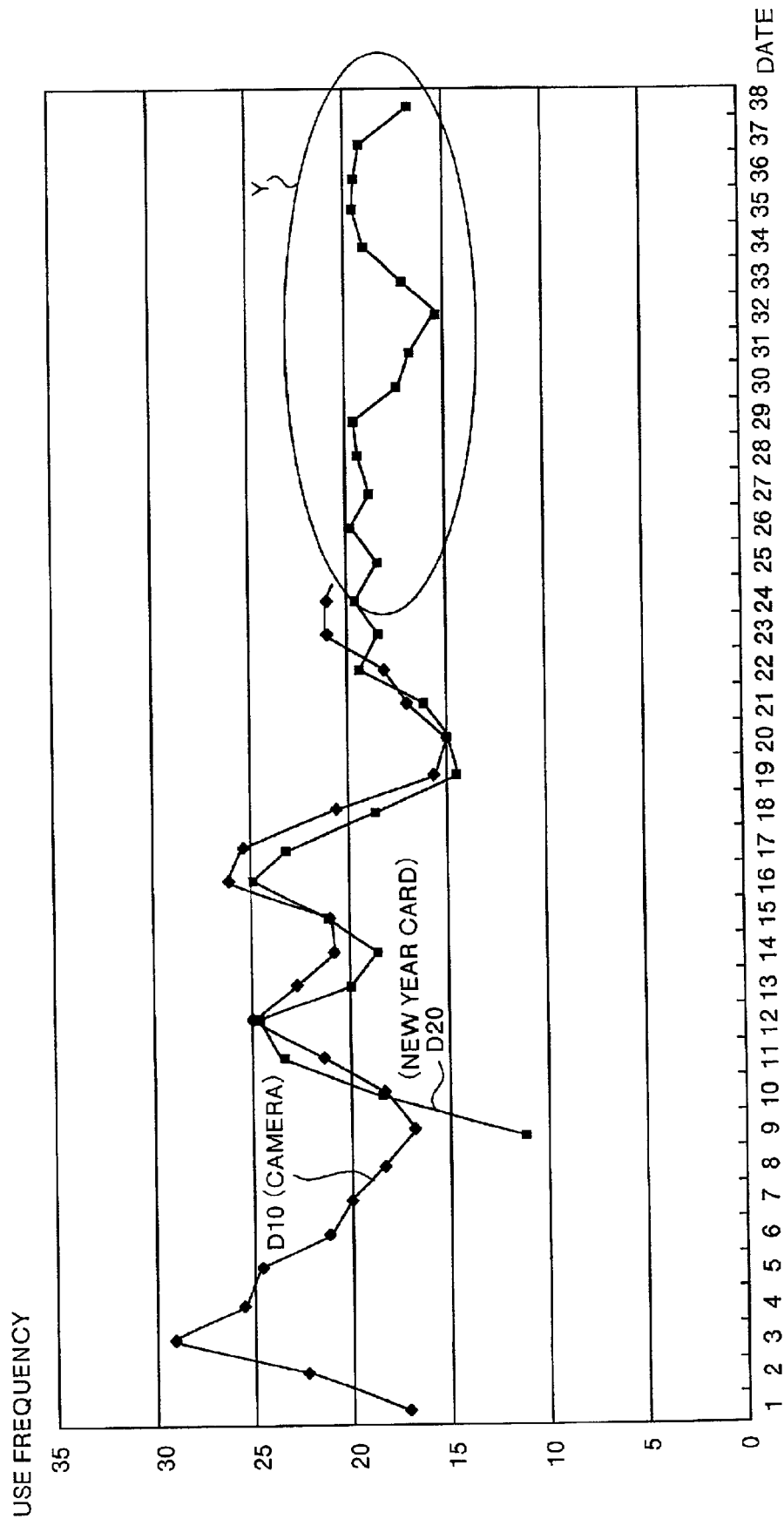
FIG. 10 is a diagram for explaining the operation in the first embodiment.

The prediction section 106 predicts the use frequency in the first time series data D10 after December 25th, using the data (the ellipse Y) in the second time series data D20 after December 25th shown in FIG. 10. Specifically, the prediction section 106 calculates the equation (6) representing a straight line of the predicted portion, by the regression analysis using the method of least squares:

$$p = md + k \quad (6)$$

In equation (6), "p" denotes a function of the straight line, being a prediction value related to the use frequency of the keyword K to be predicted. "$m$" denotes the inclination of the straight line, and is expressed by the equation (7). "d" denotes a value of the second time series data D20 corresponding to the reference keyword KW (New Year card). "k" denotes a y section in the straight line, and is expressed by the equation (8).

$$m = \frac{n\left(\sum_{i=1}^{n}(x_i \times y_i)\right) - \left(\sum_{i=1}^{n} x_i\right)\left(\sum_{i=1}^{n} y_i\right)}{n\left(\sum_{i=1}^{n}(x_i^2)\right) - \left(\sum_{i=1}^{n} x_1\right)^2} \quad (7)$$

$$k = \frac{\left(\left(\sum_{i=1}^{n} y_i\right)\left(\sum_{i=1}^{n}(x_i^2)\right)\right) - \left(\sum_{i=1}^{n} x_i\right)\left(\sum_{i=1}^{n} x_i y_i\right)}{n\left(\sum_{i=1}^{n}(x_i^2)\right) - \left(\sum_{i=1}^{n} x_i\right)^2} \quad (8)$$

In equations (7) and (8), "n" denotes the number of data overlapping on each other time wise, of a plurality of data constituting the first time series data and a plurality of data constituting the second time series data. With regard to the first time series data, the plurality of data overlapping on the second time series data time wise is expressed as $x_1$ to $x_n$. On the other hand, with regard to the second time series data, the plurality of data overlapping on the first time series data time wise is expressed as $y_1$ to $y_n$.

When prediction of the use frequency is finished, in step SA5 shown in FIG. 7, the prediction section 106 outputs the predicted use frequency data obtained in step SA4 from the output section 107. This predicted use frequency data corresponds to the portion of the ellipse Y shown in FIG. 10, and shows the use frequency after December 25th related to the first time series data D10 (camera).

As described above, according to the first embodiment, temporal operation is sequentially performed in a unit of predetermined time, with respect to the relative relation between the first pattern corresponding to the first time series data D10 and the second pattern corresponding to the second time series data D20, shown in FIG. 4. For each unit of predetermined time (for every shift), the correlation coefficient between the first time series data D10 and second time series data D20 is calculated, and based on the second pattern corresponding to a pair of the first time series data D10 and the second time series data D20 corresponding to the correlation coefficient having the highest value, the use frequency of the first time series data D10 constituting the pair is predicted (FIG. 10). As a result, the use frequency of information can be predicted at high accuracy, compared to the case where the prediction is performed based on one time series information as in the conventional case.

According to the first embodiment, with regard to all combinations of a plurality of first time series information in the plurality of first summing data B10 belonging to the first group and a plurality of second time series information in the second summing data B20, temporal operation is performed. Hence, with an increase of the combination, the probability that a combination having a high correlation coefficient exists is increased, and hence the use frequency of information can be predicted at high accuracy.

According to the first embodiment, as shown in FIG. 4, the second time series data D20 is shifted, sequentially on the time base in a unit of predetermined time, based on the first time series information. As a result, even if the period of the trend or the like is deviated, pairs having a high correlation coefficient are practically specified. Hence, the use frequency of information can be predicted at high accuracy.

According to the first embodiment, since the first search log data A10 and the second search log data A20 are collected via different collection routes, the use frequency can be predicted based on the information from a wide field, thereby the prediction accuracy can be further increased.

According to the first embodiment, the first time series data D10 (camera) and the second time series data D20 (New Year card) are designated as the time series information for the use frequency of keywords in the keyword search engine on the Internet. Hence, the use frequency of the keyword on the Internet can be predicted at high accuracy.

Figure 11:
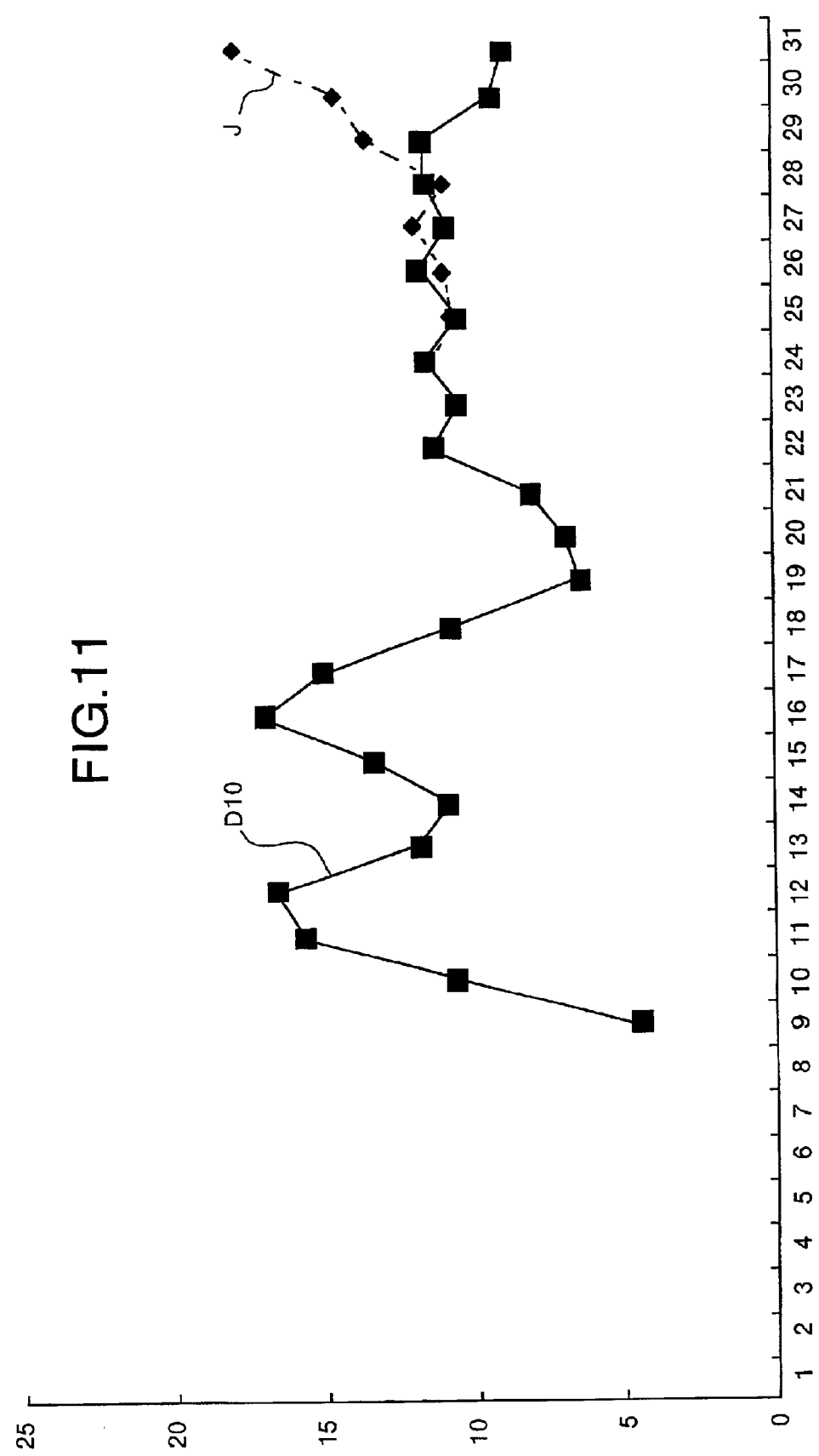
FIG. 11 is a diagram for explaining the effect in the first embodiment.

FIG. 11 is a diagram for explaining the effect of the first embodiment. In this figure, the first time series data D10 corresponds to the "camera" as the above-described keyword. In this first time series data D10, the data before December 24th is the actual measurement value. Moreover, in the first time series data D10, the data after December 24th is predicted data by the above-described method.

After December 25th, the actual measurement data J is actual measurement data related to the use frequency of "camera" as the keyword. As seen from this figure, the actual measurement data J substantially agrees with the first time series data D10 after December 25th (predicted value), and hence the average error is 17%. On the other hand, with prediction by means of the conventional time series analysis, the average error between the actual measurement value and the predicted value becomes 40%. As described above, with the method in the first embodiment, the average error is reduced by 23% compared to the conventional method, and the prediction accuracy increases significantly.

In the first embodiment, the predicted use frequency data may be sorted in the prediction section 106 shown in FIG. 1. This case will be described below as the second embodiment.

Figure 12:
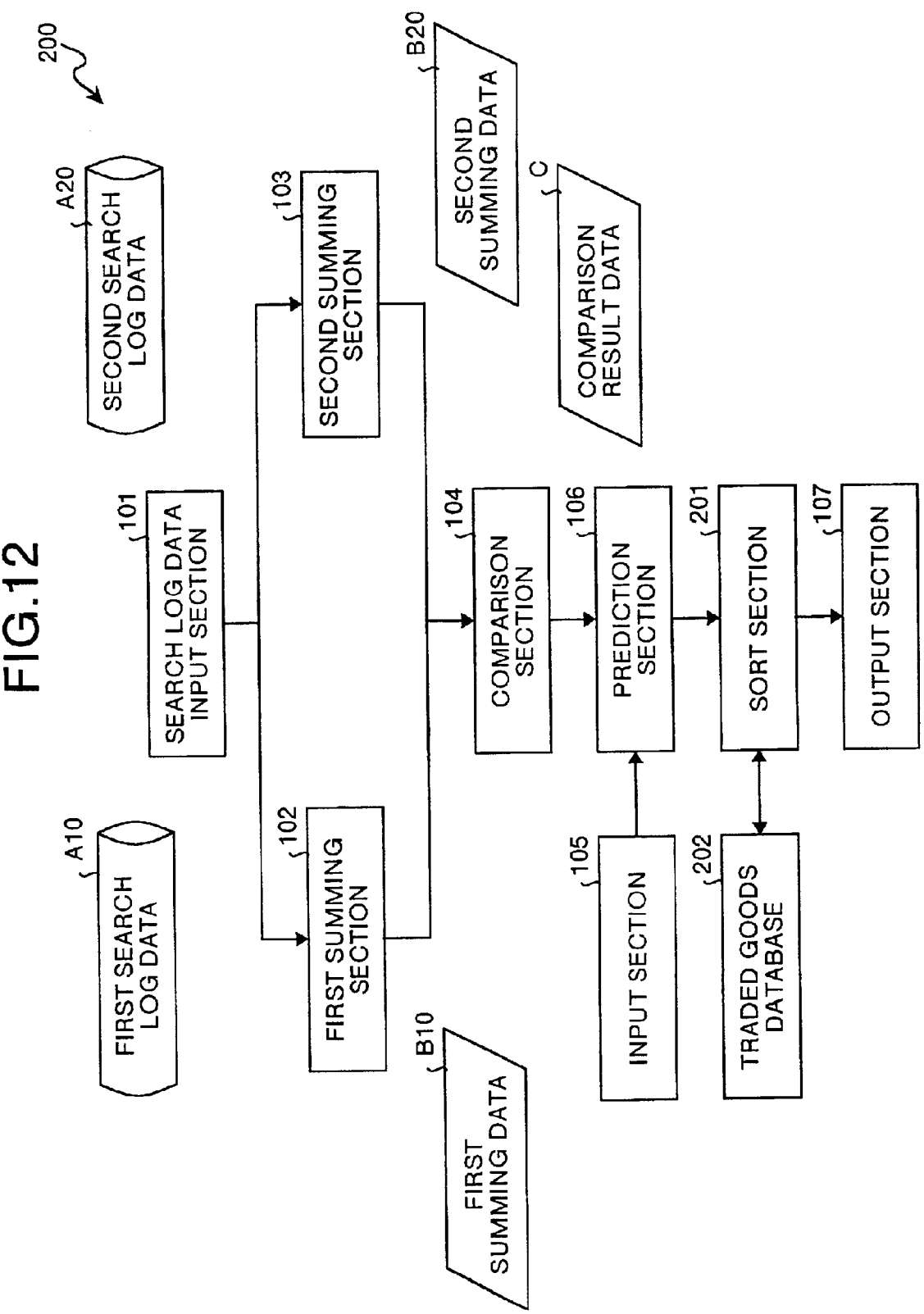
FIG. 12 is a block diagram showing the construction of a second embodiment according to the present invention.

FIG. 12 is a block diagram showing the construction of the second embodiment according to the present invention.

In this figure, the section corresponding to respective section in FIG. 1 is denoted by the same reference symbol. In the information use frequency prediction apparatus 200 shown in this figure, a sort section 201 and a traded goods database 202 are newly provided.

The sort section 201 has a function of preparing traded goods corresponding to the keyword, and predicted use frequency data E1 (see FIG. 14) representing the relation with the predicted use frequency of the keyword, based on the predicted use frequency data from the prediction section 106. The sort section 201 also has a function of sorting the predicted use frequency data E1 shown in FIG. 14, by using the predicted use frequency therein as a sort key, for example, in an ascending order, to thereby prepare the sorted predicted use frequency data E2.

Returning to FIG. 12, the traded goods database 202 is database representing the correspondence between the keyword and traded goods in shops. This traded goods database 202 is utilized at the time of preparing the predicted use frequency data E1 in the sort section 201.

The operation of the second embodiment will be described with reference to the flowchart shown in FIG. 13. Step SD1 to step SD4 shown in FIG. 13 are the same processing as in step SA1 to step SA4 shown in FIG. 7, and hence the description thereof is omitted.

Figure 13:
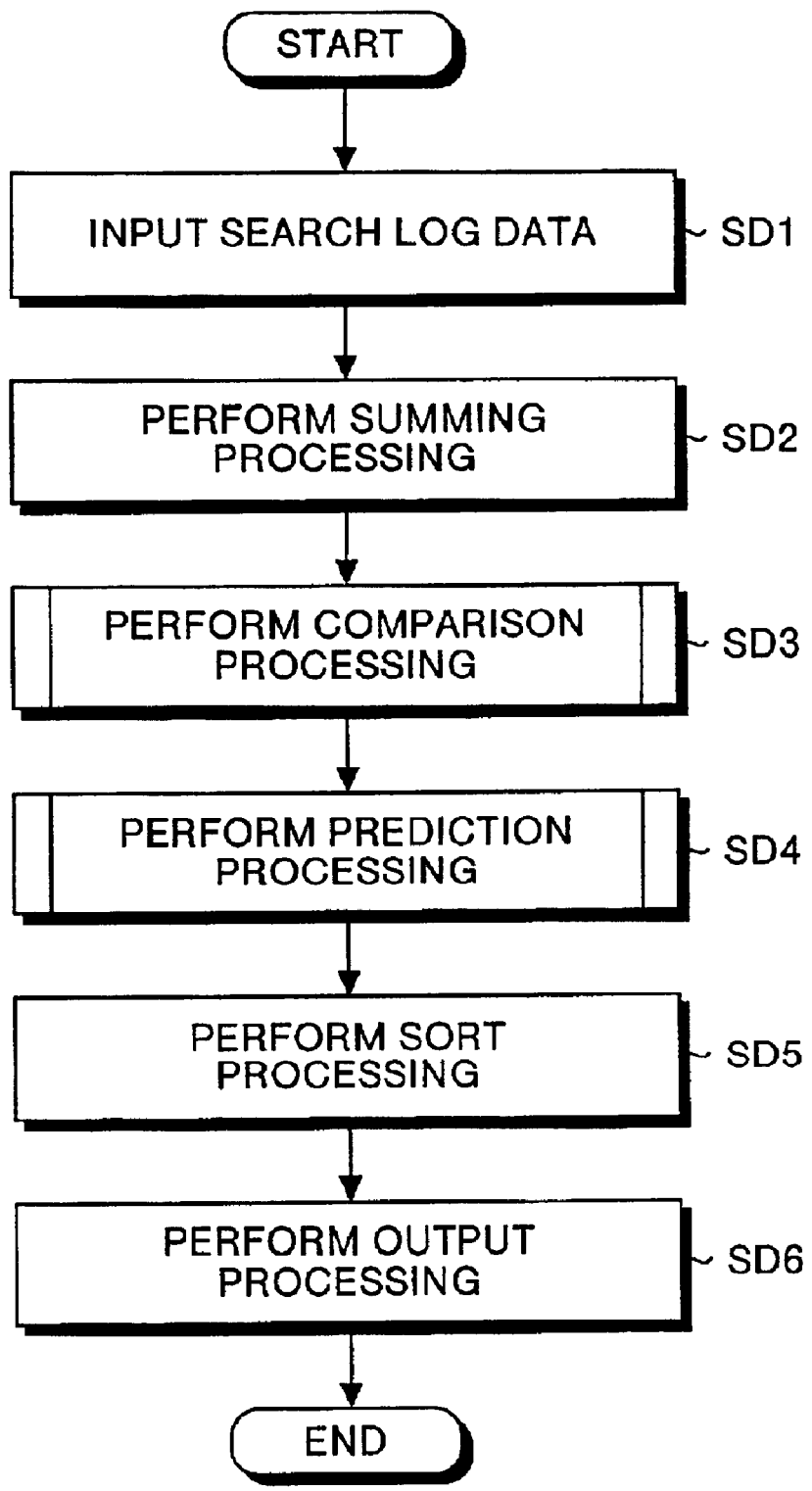
FIG. 13 is a flowchart for explaining the operation in the second embodiment.
Figure 14:
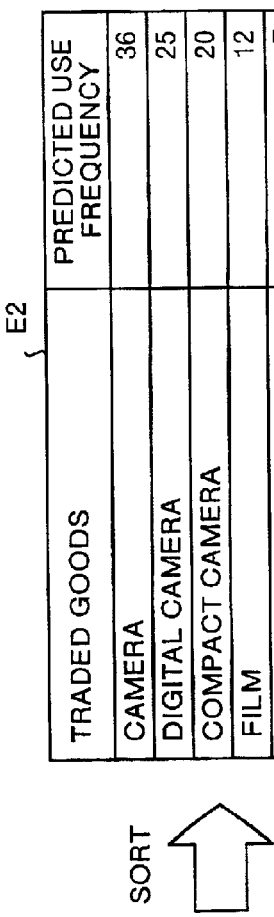
FIG. 14 is a diagram for explaining the sort processing shown in FIG. 13.

In this case, when the predicted use frequency data related to a plurality of keywords is output from the prediction section 106, in step SD5 shown in FIG. 13, the sort section 201 refers to the traded goods database 202 to convert the keyword to the traded goods, to thereby prepare the predicted use frequency data E1 shown in FIG. 14.

The sort section 201 sorts the predicted use frequency data E1 in an ascending order, using the predicted use frequency as the sort key. This sort result is the sorted predicted use frequency data E2. In step SD6, the sort section 201 outputs the sorted predicted use frequency data E2 from the output section 107.

As described above, according to the second embodiment, as shown in FIG. 14, a plurality of prediction results are sorted using the use frequency as a key. As a result, from the sort result of the predicted use frequency, for example, information of well selling goods in shops or the like dealing with electronic transaction can be easily obtained, thereby enabling sales promotion.

In the first embodiment, the description is given to a case where, as shown in FIG. 4, the second time series data D20 is simply shifted by 1 from the left to the right without changing the pattern, with respect to the first time series data D10, to thereby obtain the correlation coefficient between these data. However, in addition to such shift processing, the time base of the pattern in the second time series data D20 may be expanded or contracted, to thereby obtain the correlation coefficient between these data. This case will be described below as the third embodiment.

Figure 15:
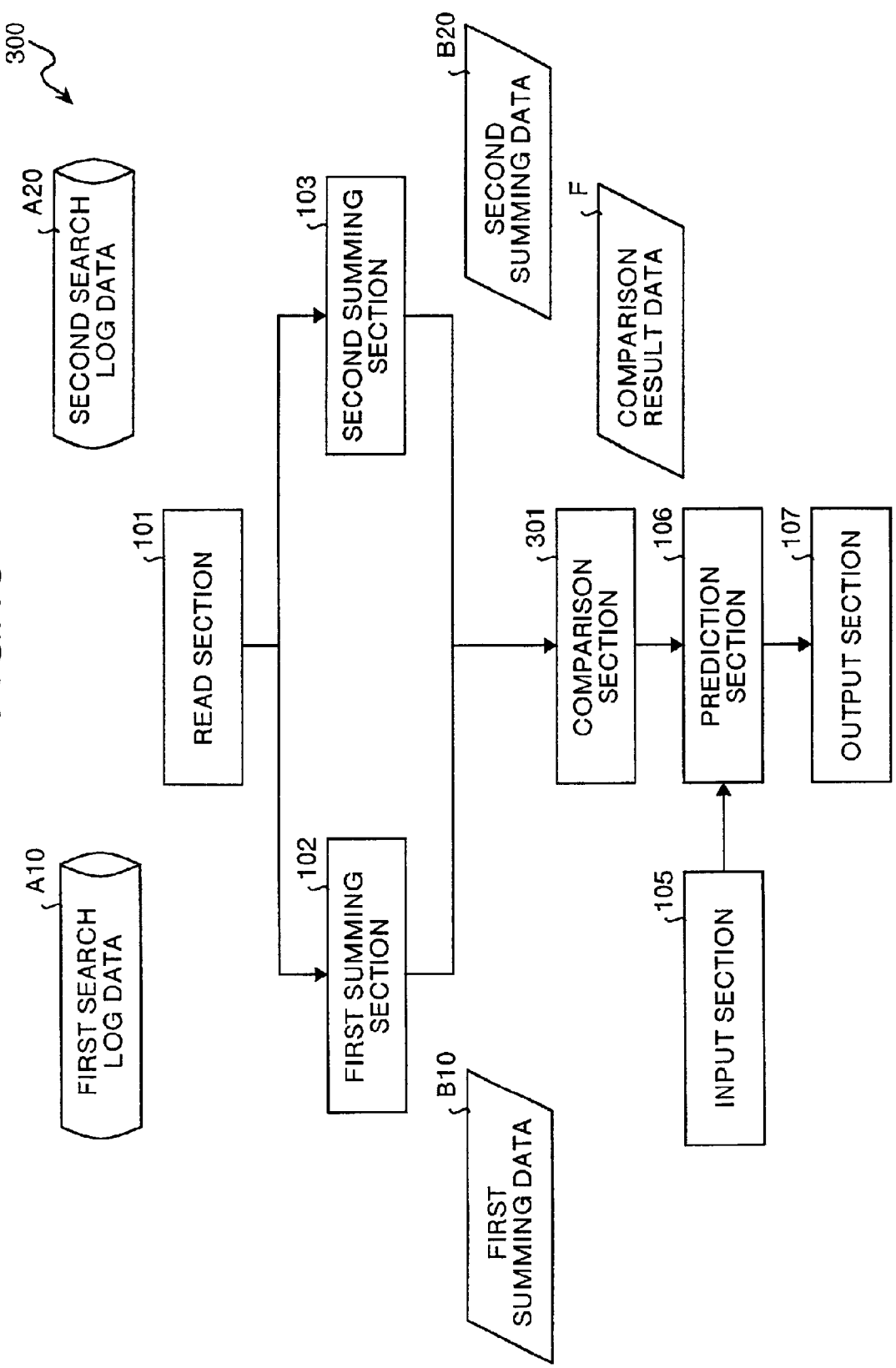
FIG. 15 is a block diagram showing the construction of a third embodiment according to the present invention.

FIG. 15 is a block diagram showing the construction of the third embodiment according to the present invention. In this figure, the section corresponding to respective section in FIG. 1 is denoted by the same reference symbol. In the information use frequency prediction apparatus 300 shown in this figure, a comparison section 301 is provided instead of the comparison section 104 shown in FIG. 1.

The comparison section 301 sequentially compares one of the first time series data contained in the first summing data B10 and one of the second time series data contained in the second summing data B20, and outputs the comparison result data F (see FIG. 16).

Figure 17:
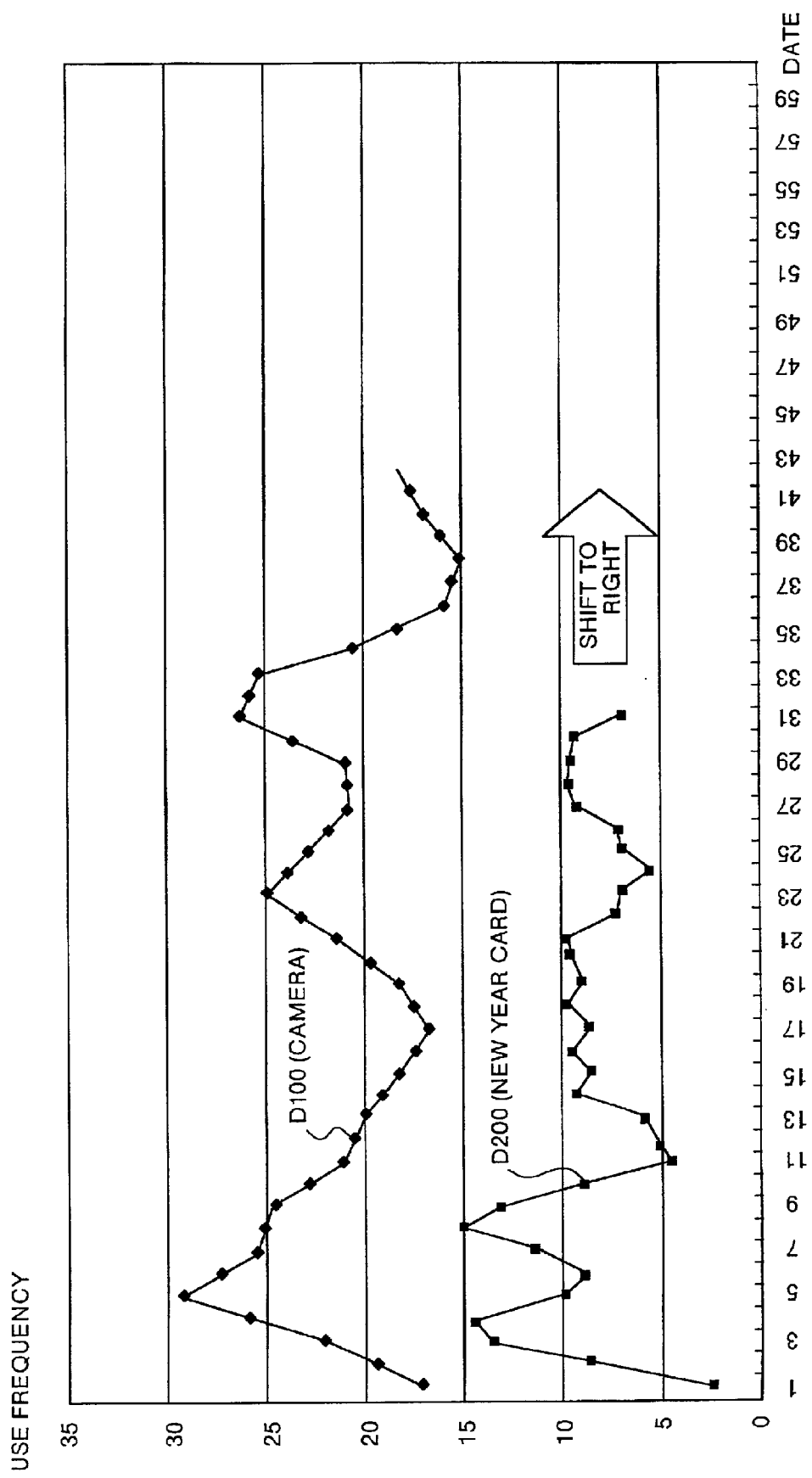
FIG. 17 is a diagram for explaining the operation in the third embodiment.

Specifically, the comparison section 301 shifts the second time series data D200 to the left in the figure by T, based on the first time series data D100, as shown in FIG. 17. The comparison section 301 contracts the time base of the pattern in the second time series data D200 in the shifted state, for example, at an expansion ratio d=50% (see FIG. 18). This expansion ratio d=50% is a threshold of the expansion ratio determined beforehand.

That is to say, the comparison section 301 shifts the second time series data D200 to the left in the figure by T (maximum value), and then contracts the time base at 50%. In this state, the comparison section 301 determines the correlation coefficient of the first time series data D100 and the second time series data D200 (left shift+contraction), using the equation (1).

Figure 18:
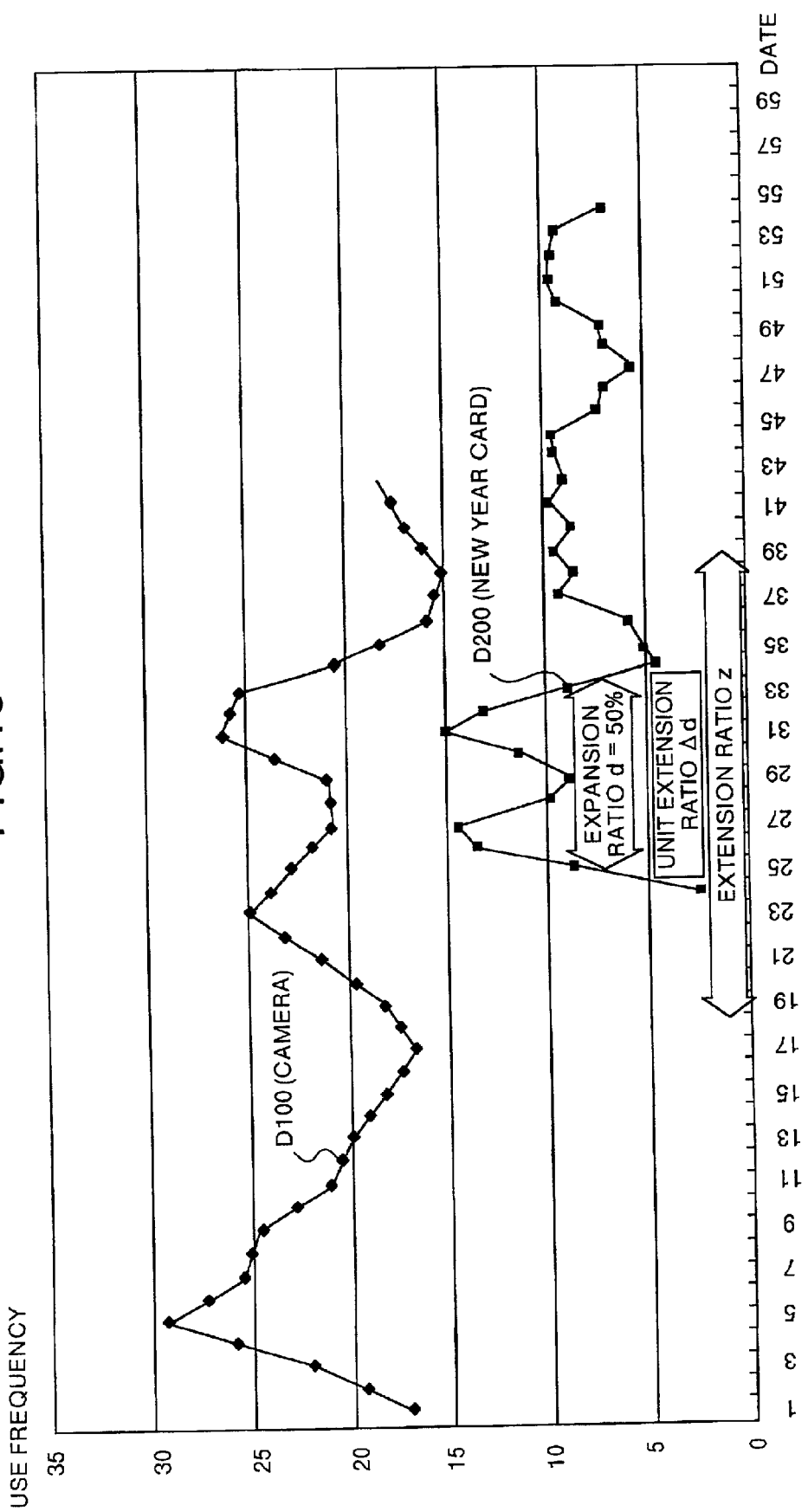
FIG. 18 is a diagram for explaining the operation in the third embodiment.

The comparison section 301 determines a correlation coefficient between the second time series data D200 and the first time series data D100, in the state with the time base of the second time series data D200 being expanded at a unit extension ratio $\Delta d$ (for example, 10%: see FIG. 18). Thereafter, the comparison section 301 sequentially determines the correlation coefficient until the expansion ratio d becomes the extension ratio z (for example, 200%: see FIG. 18), while extending the time base of the second time series data D200 by the unit extension ratio $\Delta d$.

That is to say, the second time series data D200 is expanded gradually at intervals of the unit extension ratio $\Delta d$ in the range of the expansion ratio d=50% to 200%, in the state with the shift position fixed.

When the expansion ratio d becomes the extension ratio z (=200%), the comparison section 301 shifts the second time series data D200 to the right by 1, the time base of the pattern of the second time series data D200 in the shifted state is contracted at the expansion ratio d=50%. In this state, the comparison section 301 determines the correlation coefficient between the second time series data D200 and the first time series data D100.

Thereafter, the comparison section 301 determines the correlation coefficient, every time the second time series data D200 is expanded gradually at intervals of the unit extension ratio $\Delta d$ in the range of the expansion ratio d 50% to 200%, in the state with the shift position fixed. The shift and expansion of the second time series data D200 is performed until the second time series data D200 is shifted to the right by T.

As described above, the comparison section 301 performs the 1 shift operation to −T to +T, expansion and contraction of the time base, and calculation of the correlation coefficient, with respect to all combinations of the first time series data D100 and the second time series data D200.

FIG. 16 is a diagram showing the comparison result data F output from the comparison section 301. The comparison result data F is constituted of "first time series data", "second time series data", "correlation coefficient", "time difference" and "expansion ratio". These "first time series data", "second time series data" and the "time difference" are equivalent to "first time series data", "second time series data" and "time difference" in the comparison result data C shown in FIG. 5.

That is to say, the "first time series data" is time series data related to keywords contained in the first summing data B10 (see FIG. 2). The "second time series data" is time series data related to the keyword contained in the second summing data B20 (see FIG. 3). The "time difference" is a shift amount of the "second time series data" with respect to the "first time series data".

The "correlation coefficient" is a correlation coefficient between the "first time series data" and the "second time series data" in the state with the second time series data shifted and expanded. The "expansion ratio" is an extension ratio of the time base in the second time series data, and takes a range of from 50% to 200% at intervals of a unit extension ratio Δd (=10%), as described above.

The operation in the third embodiment will now be described with reference to the flowchart shown in FIG. 20 to FIG. 22. Step SE1, step SE2, step SE4 and step SE5 shown in FIG. 20 correspond to step SA1, step SA2, step SA4 and step SA5 shown in FIG. 7.

Figure 8:
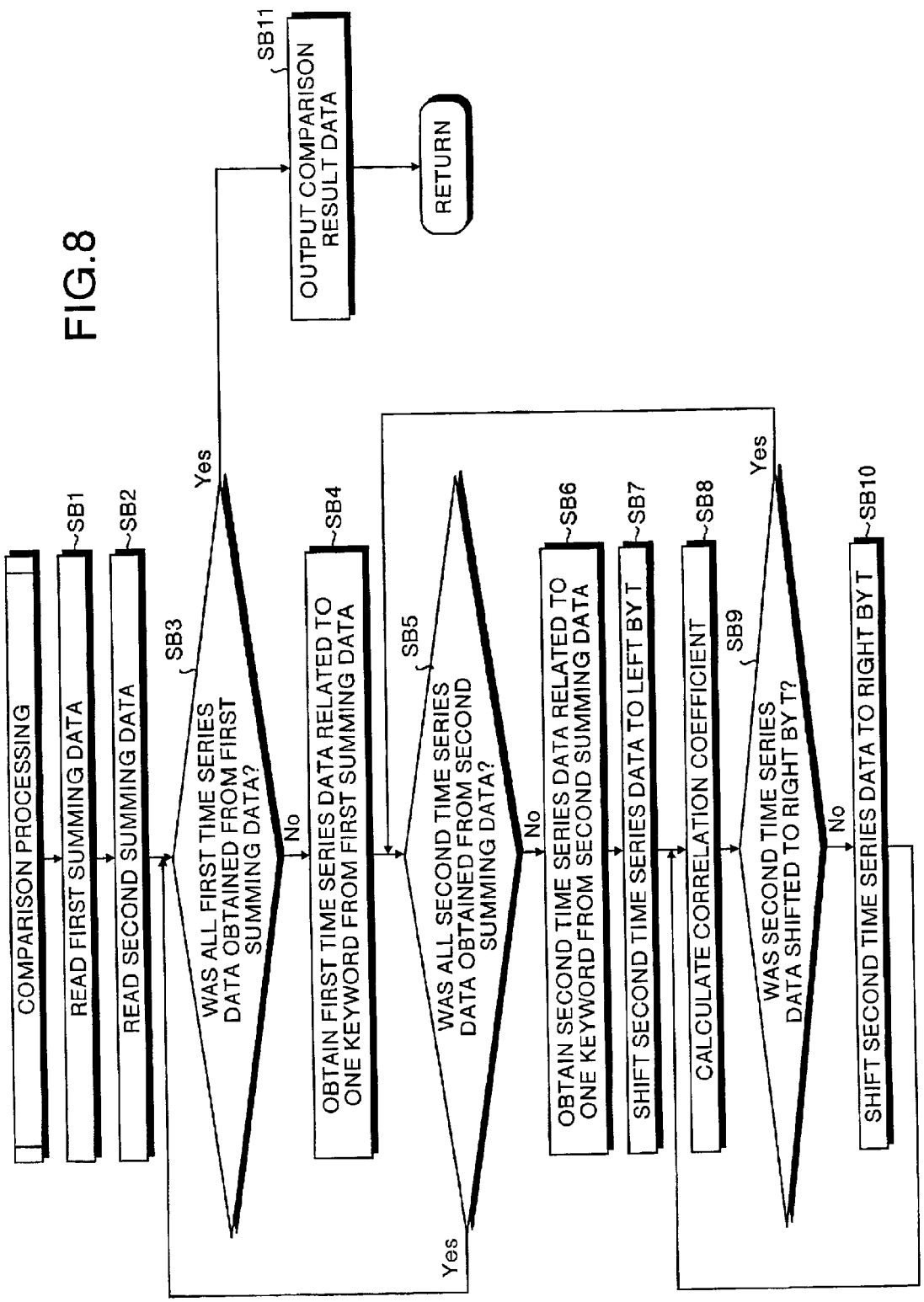
FIG. 8 is a flowchart for explaining the comparison operation shown in FIG. 7.
Figure 21:
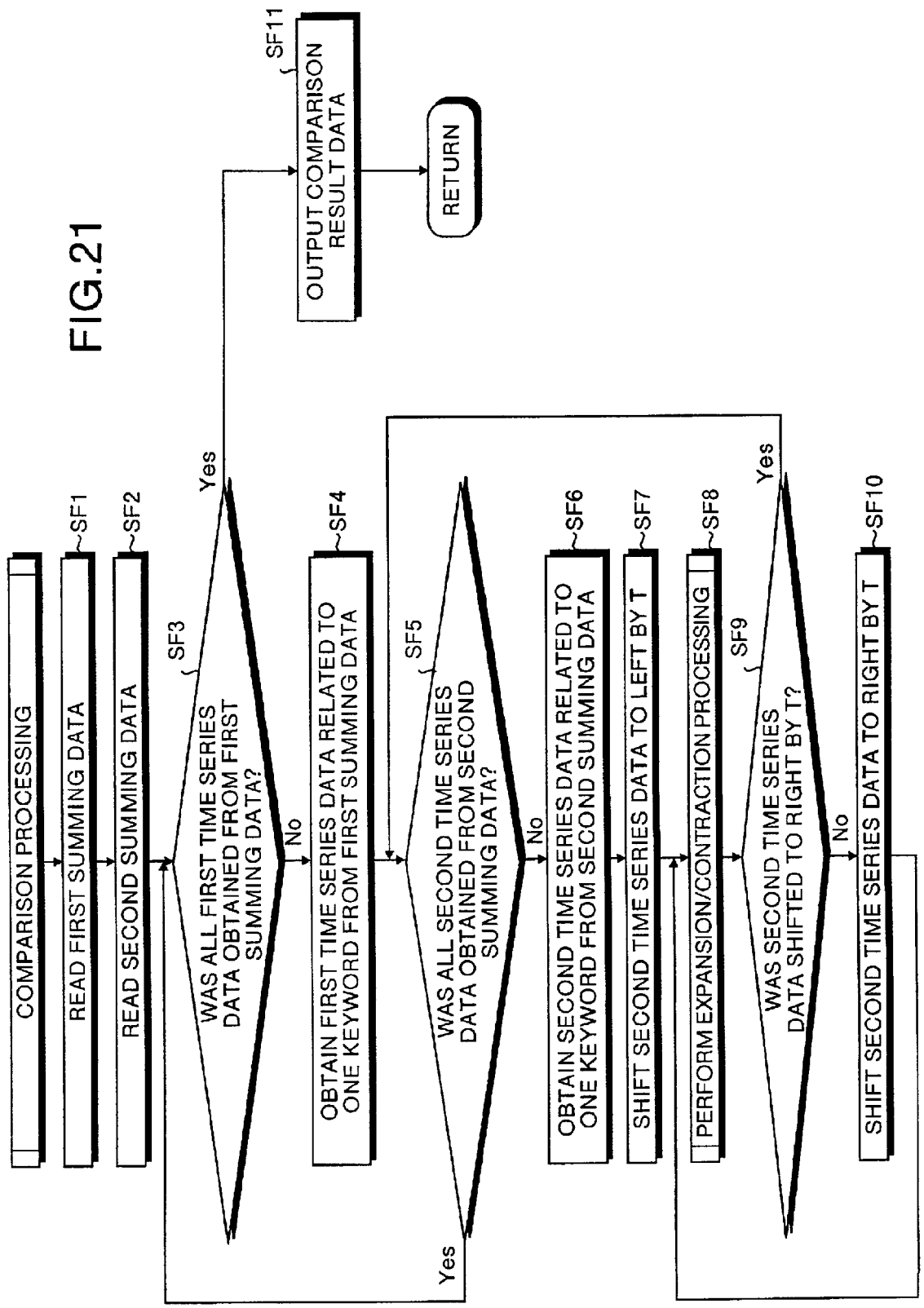
FIG. 21 is a flowchart for explaining the comparison operation shown in FIG. 20.

Step SF1 to step SF7 and step SF9 to step SF11 shown in FIG. 21 correspond to step SB1 to step SB7 and step SB9 to step SB11 shown in FIG. 8.

Figure 20:
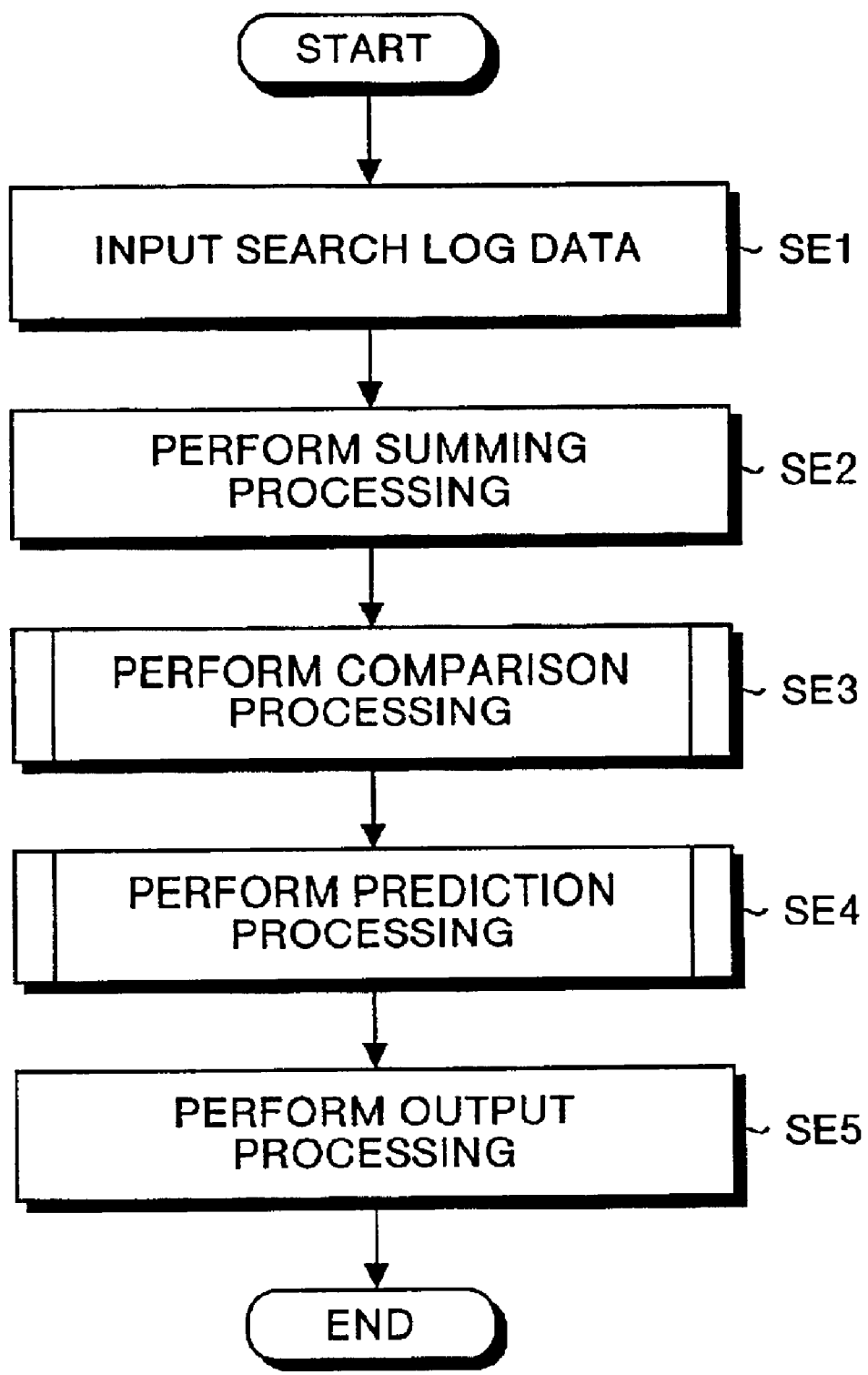
FIG. 20 is a flowchart for explaining the operation in the third embodiment.

In step SE1 shown in FIG. 20, the read section 101 reads the first search log data A10 (see FIG. 2) and the second search log data A20 (see FIG. 3), and outputs these data to the first summing section 102 and the second summing section 103.

In step SE2, the first summing section 102 and the second summing section 103 execute the summing processing, and stores the first summing data B10 and the second summing data B20 in the respective memory (not shown).

In step SE3, the comparison section 301 executes the comparison processing. That is to say, in step SF1 shown in FIG. 21, the comparison section 301 reads the first summing data B10 (see FIG. 2), and in step SF2, the comparison section 104 reads the second summing data B20 (see FIG. 3).

Instep SF3, the comparison section 301 judges whether the first time series data related to all the keywords has been obtained or not from the first summing data B10 (see FIG. 2), in the similar manner as in step SB3 (see FIG. 8). In this case, the judgment result is assumed to be "No". In step SF4, the comparison section 301 obtains the first time series data D100 shown in FIG. 17, related to one keyword (for example, camera).

In step SF5, the comparison section 301 judges whether the second time series data related to all the keywords has been obtained or not from the second summing data B20 (see FIG. 3), in the similar manner as in step SB5 (see FIG. 8). In this case, this judgment result is assumed to be No".

In step SF6, the comparison section 301 obtains the second time series data D200 shown in FIG. 17, related to one keyword (for example, New Year card). It is seen that the graph waveform of the second time series data D200 is approximate to the waveform in which the pattern of the first time series data D100 is contracted on the time base.

In step SF7, the comparison section 301 shifts the second time series data D200 to the left by T, in the similar manner as in step SB7 (see FIG. 8). In step SF8, the comparison section 301 executes the expansion and contraction processing for expanding and contracting the second time series data D200.

Figure 22:
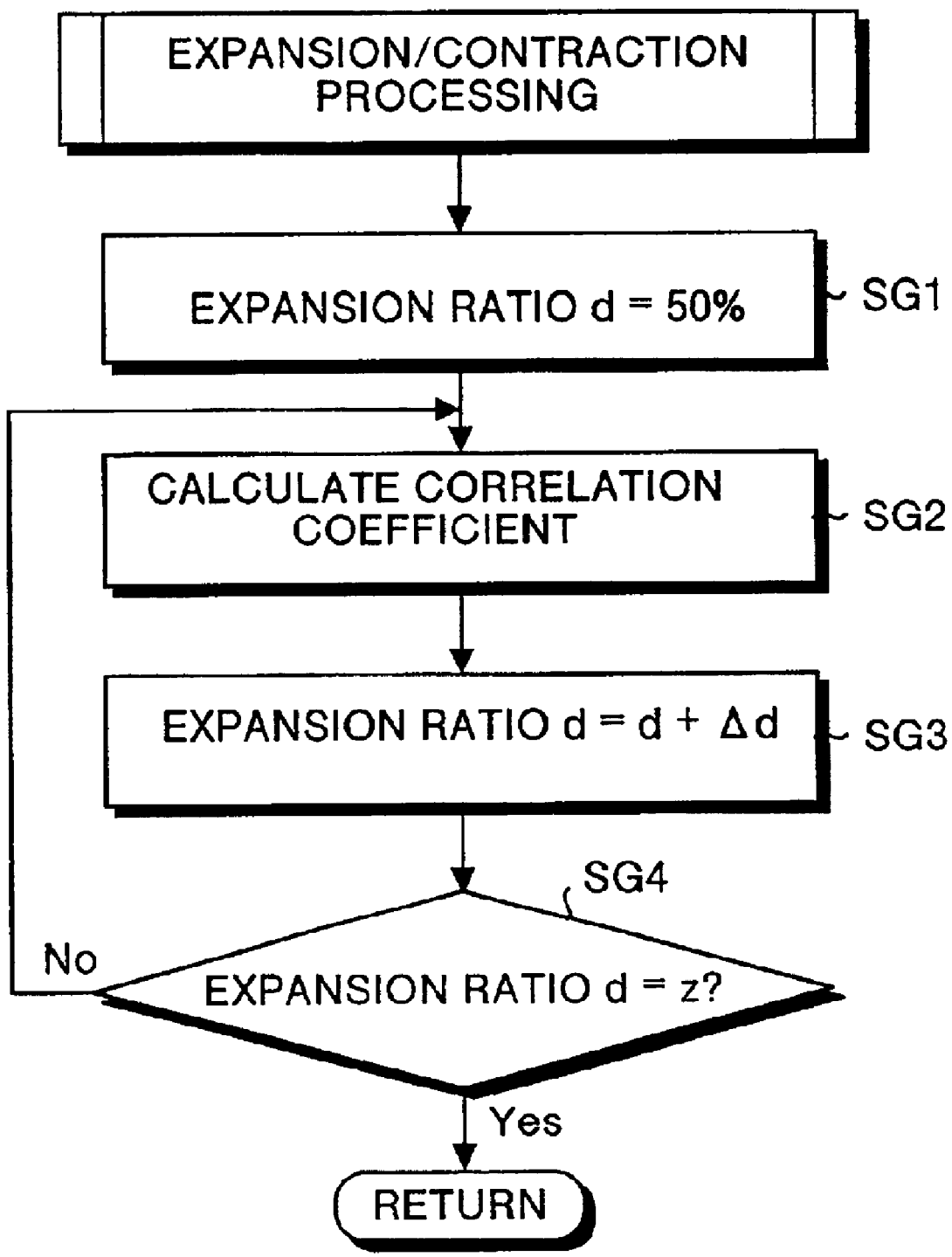
FIG. 22 is a flowchart for explaining the expansion and contraction operation shown in FIG. 21.

Specifically, in step SG1 shown in FIG. 22, the comparison section 301 contracts the time base of the second time series data D200, designating the expansion ratio d as 50%. In step SG2, the comparison section 301 calculates the correlation coefficient between the second time series data D200 and the first time series data D100 (for example, 0.1: see FIG. 16), in the shifted and contracted state, from equation (1) described above.

The comparison section 301 prepares the comparison result data F shown in FIG. 16 (first time series data (camera), second time series data (New Year card), correlation coefficient=0.1, time difference=−T, expansion ratio= 50%), as the comparison result.

In step SG3, the comparison section 301 adds the unit extension ratio Δd (=10%) to the expansion ratio d (=50%) to make the expansion ratio d to 60%. That is to say, the comparison section 301 expands the second time series data D200 by 10%, by increasing the expansion ratio d of the time base of the second time series data D200 to 60%.

In step SG4, the comparison section 301 judges whether or not the expansion ratio d (=60%) is the extension ratio z (=200%), and in this case, it is assumed that the judgment result is "No". Thereafter, until the expansion ratio d becomes 200%, step SG2 to step SG4 are repeated.

Thereafter, the comparison section 301 sequentially determines the correlation coefficient, every time the second time series data D200 is expanded gradually at intervals of the unit extension ratio Δd in the range of the expansion ratio d=60% to 200%, in the state with the shift position of the second time series data D200 being fixed.

When the judgment result in step SG4 becomes "Yes", in step SF9 shown in FIG. 21, the comparison section 301 judges whether or not the second time series data D200 has been shifted to the right by T, in the same manner as in step SB9 (see FIG. 8), and in this case, the judgment result is assumed to be "No". In step SF10, the comparison section 301 shifts the second time series data (in this case, the second time series data D200: see FIG. 17) to the right by 1.

Thereafter, step SF8 to step SF10 are repeated. As a result, the second time series data D200 is shifted to the right by 1 with respect to the first time series data D100, and the time base is expanded or contracted in the range of from 50% to 200%, and the correlation coefficient is determined corresponding to the time difference and the expansion ratio (see FIG. 16).

That is to say, a correlation coefficient related to the combination of the shift frequency and the expansion frequency of the first time series data (camera) in the first summing data B10 shown in FIG. 2 and the second time series data (New Year card) in the second summing data B20 shown in FIG. 3 is determined corresponding to the time difference and the expansion ratio.

Figure 19:
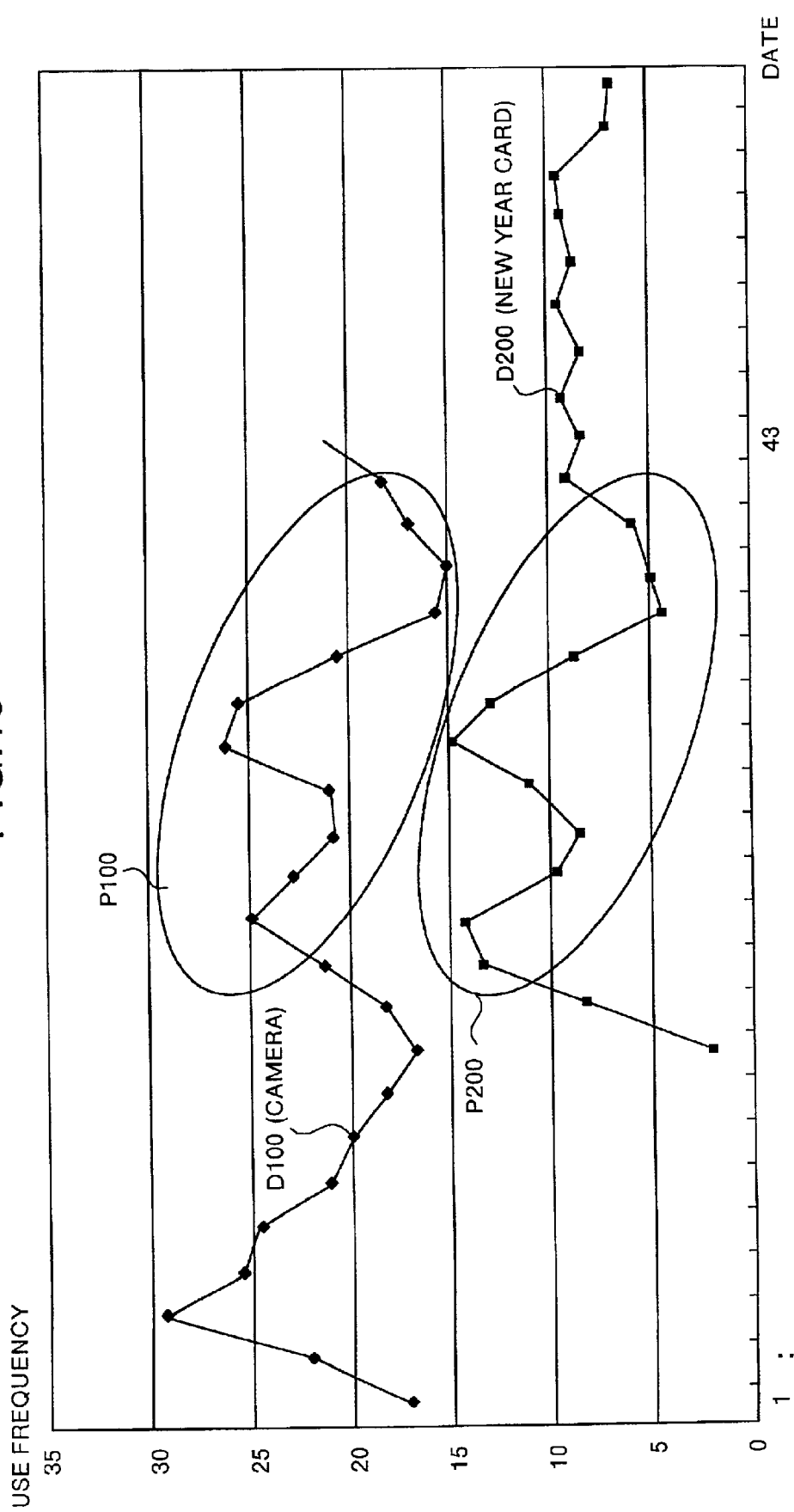
FIG. 19 is a diagram for explaining the operation in the third embodiment.

The first time series data D100 (camera) in the case where the time base is expanded or contracted at a certain value with the second time series data D200 (New Year card) shifted to the right by a certain value is shown in FIG. 19. As seen from this figure, the pattern of the ellipse P100 substantially coincides time wise with the pattern of the ellipse P200. The correlation coefficient in this case is designated as, for example, 0.68, which is a very high value.

When the judgment result in step SF9 becomes "Yes", then in step SF5, the comparison section 301 judges whether the second time series data related to all the keywords is obtained or not from the second summing data B20 (see FIG. 3), and in this case, the judgment result is assumed to be "No". In step SF6, the comparison section 301 obtains the second time series data (not shown) related to the next keyword (for example, radio).

In step SF7, the comparison section 301 shifts the second time series data (radio) to the left by T. In step SF8, the comparison section 301 calculates a correlation coefficient between the second time series data (radio) and the first time series data (camera) in the shifted state, from the equation (1).

Thereafter, the above-described operation is repeated. When a correlation coefficient of the combination of the shift frequency and the expansion frequency, which is the combination of the first time series data related to all the keywords and the second time series data related to all the keywords, is obtained, the judgment result in step SF3 becomes "Yes". In step SF11, the comparison section 301 outputs the comparison result data F shown in FIG. 16 to the prediction section 106.

Figure 9:
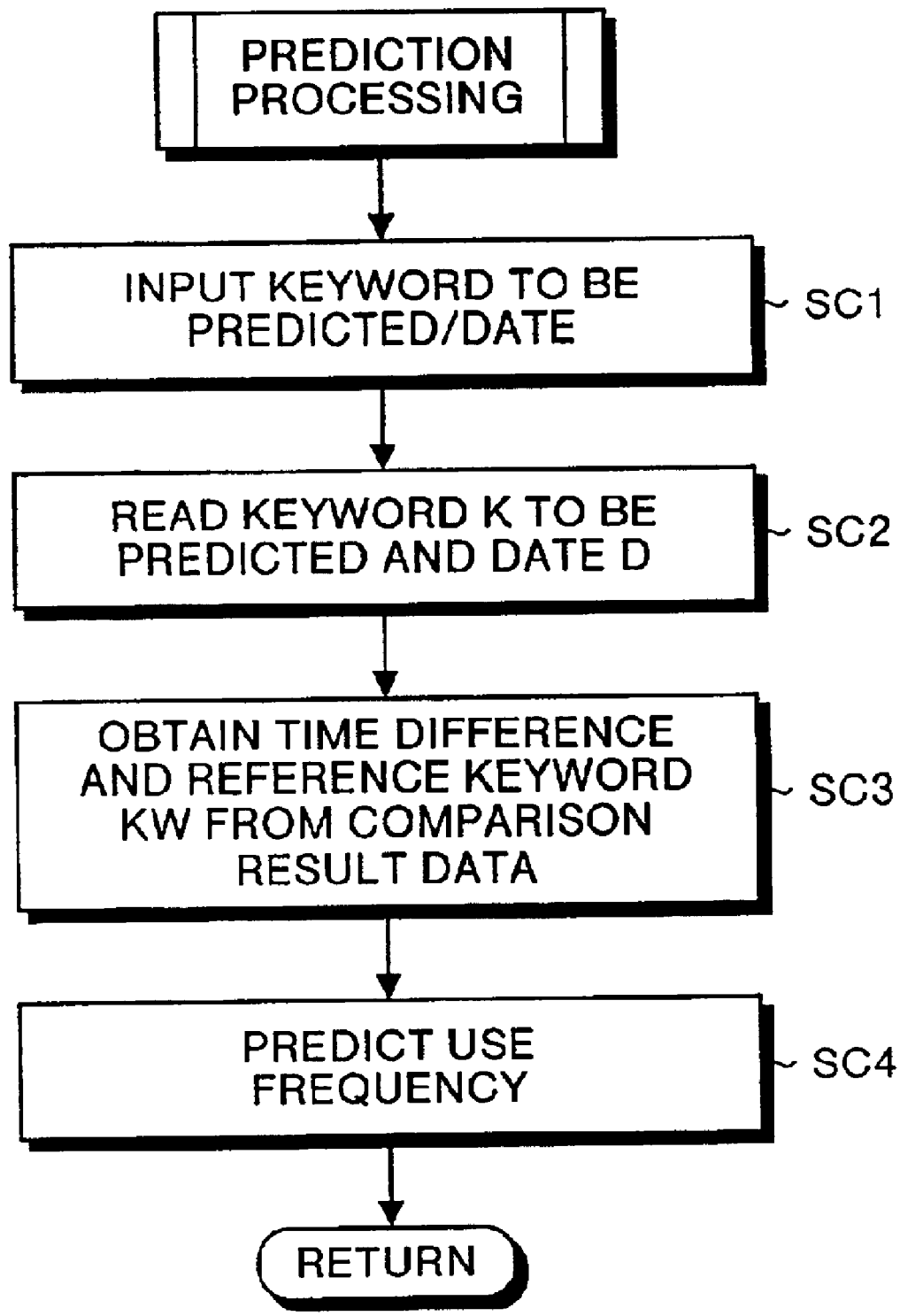
FIG. 9 is a flowchart for explaining the prediction operation shown in FIG. 7.

In step SE4 shown in FIG. 20, the prediction section 106 executes the prediction processing based on the comparison result data F (see FIG. 16), in the same manner as the prediction processing shown in FIG. 9. In the case where correlation coefficient of the combination of the first time series data D100 and the second time series data D200 shown in FIG. 19 is the highest, the prediction section 106 predicts the use frequency of the keyword (camera) in the first time series data D100, from the second time series data D200 by the above-described method.

As described above, according to the third embodiment, the second time series data D200 is sequentially shifted on the time base in a unit of predetermined time, based on the first time series data D100 shown in FIG. 17 to FIG. 19, and the shifted second time series data D200 is sequentially expanded or contracted in a unit of predetermined expansion and contraction (the unit extension ratio Δd). Hence, even if the period of the trend or the like is deviated, or the speed of the trend or the like is different, pairs having a high correlation coefficient are practically specified. As a result, the use frequency of information can be predicted at high accuracy.

According to the third embodiment, the second time series data D200 is sequentially expanded or contracted time wise in a unit of predetermined expansion and contraction (the unit extension ratio Δd), based on the first time series data D100 shown in FIG. 17 to FIG. 19. Hence, even if the speed of the trend or the like is different, pairs having a high correlation coefficient are practically specified. As a result, the use frequency of information can be predicted at higher accuracy.

The first to the third embodiments according to the present invention have been described in detail above, with reference to the drawings, but the specific configuration example is not limited to these first to the third embodiments, and design changes or the like without departing from the scope of the present invention are also included in the present invention.

For example, in the above-described first to the third embodiments, description has been made of the case where the respective search log data of two search engines are designated as the first search log data A10 and the second search log data A20 (FIG. 1, FIG. 12 and FIG. 15), and the summing is performed in the two first summing section 102 and second summing section 103. However, the present invention is not limited thereto, and for example, the construction may be such that there is only one summing section.

In this case, the above summing section divides the search log data in one search engine into two groups, and summing is performed for the respective groups, and the first summing data B10 and the second summing data B20 maybe output. In this case, since the summing section may be only one, the construction can be simplified.

In the above-described first to third embodiments, description has been made by taking keywords in the Internet search as one example of the object to be predicted for use frequency, but the object to be predicted is not limited to the keyword and any information may be predicted.

In the first to third embodiments, the information use frequency prediction program for realizing the function of the above-described information use frequency prediction apparatus 100 (see FIG. 1), information use frequency prediction apparatus 200 (see FIG. 12), or information use frequency prediction apparatus 300 (see FIG. 15) is recorded on a computer-readable recording medium 500 shown in FIG. 23, and the information use frequency prediction program recorded on this recording medium 500 is read in a computer 400 shown in this figure and executed, thereby a series of use frequency prediction processing related to keywords (information) may be executed.

The computer 400 is constituted of a CPU 410 for executing the above information use frequency prediction program, an input unit 420 such as a keyboard or a mouse, a ROM (Read Only Memory) 430 for storing various data, a RAM (Random Access Memory) 440 for storing the operation parameters, a reader 450 for reading the information use frequency prediction program from the recording medium 500, an output unit 460 such as a display and a printer, and a bus 470 for connecting each section.

The CPU 410 executes the above-described series of use frequency prediction processing related to keywords (information), by reading the information use frequency prediction program stored on the recording medium 500 via the reader 450, and executing the information use frequency prediction program. The recording medium 500 includes not only a portable recording medium such as an optical disk, a floppy disk or a hard disk, but also a transmission medium such as network, which temporarily records and holds the data.

As described above, according to the present invention, temporal operation is performed in a unit of predetermined time, sequentially, with respect to the relative relation between the first pattern corresponding to the first time series information and the second pattern corresponding to the second time series information, a correlation coefficient between the first time series information and the second time series information is calculated, for each unit of the predetermined time, and use frequency of the first time series information constituting the pair is predicted based on the second pattern corresponding to the pair of the first time series information and the second time series information, corresponding to the correlation coefficient having the highest value. Hence, there is the effect that the use frequency of information can be predicted at high accuracy, compared to the case where prediction is performed based on one time series information, as in the conventional case.

Moreover, temporal operation is performed with respect to all the combinations of the plurality of first time series information belonging to the first group and the plurality of second time series information belonging to the second group. Hence, there is also the effect that with an increase of the combination, the probability that a combination having a high correlation coefficient exists is increased, and hence the use frequency of information can be predicted at higher accuracy.

Furthermore, since a plurality of prediction results are sorted, using the use frequency as a key, from the sort results of the predicted use frequency, there can be easily obtained the information of well selling goods in shops or the like which have electronic commercial transaction sites, and there is the effect that sales promotion can be made.

Moreover, the second time series information is shifted sequentially on the time base in a unit of predetermined time, based on the first time series information, and even if the period of the trend or the like is deviated, pairs having a high correlation coefficient are practically specified. Hence, there is also the effect that the use frequency of information can be predicted at high accuracy.

Furthermore, the second time series information is expanded of contracted time wise, sequentially, in a unit of predetermined expansion and contraction, based on the first time series information. Therefore, even if the speed of the trend or the like is different, pairs having a high correlation coefficient are practically specified. Hence, there is also the effect that the use frequency of information can be predicted at high accuracy.

Moreover, the second time series information is shifted sequentially on the time base in a unit of predetermined time, and the shifted second time series information is expanded or contracted time wise, sequentially, in a unit of predetermined expansion and contraction, based on the first time series information. Therefore, even if the period of the trend or the like is deviated, or even if the speed of the trend or the like is different, pairs having a high correlation coefficient are practically specified. Hence, there is also the effect that the use frequency of information can be predicted at high accuracy.

Furthermore, the first time series information and the second time series information are designated as time series information of use frequency of keywords in a keyword search engine on the Internet. Hence, there is also the effect that the use frequency of keywords on the Internet can be predicted at high accuracy, compared to the case where prediction is performed based on one time series information as in the conventional case.

Moreover, the first time series information and the second time series information are collected via different collection routes. Hence, there is the effect that the use frequency can be predicted based on the information from a wide field; thereby the prediction accuracy can be further increased.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information use frequency prediction program which causes a computer to function as:
  a temporal operation unit which sequentially performs temporal operations in a unit of predetermined times, the temporal operations being performed with respect to a relative relation between a first pattern of a first data including use frequency based on first time series information that represents a temporal change of the use frequency of the first time series information of the first data, and a second pattern of a second data including use frequency of second time series information that represents a temporal change of the use frequency of the second time sense information based on the second data;
  a correlation coefficient calculation unit which calculates a correlation coefficient between the first time series information and the second time series information for each unit of the predetermined times based on the relative relation between the first and second patterns;
  a pair specifying unit which specifies a pair of the first time series information and the second time series information, corresponding to the correlation coefficient having the highest value, of a plurality of correlation coefficients calculated by the correlation coefficient calculation unit; and
  a prediction unit which predicts additional data of the use frequency of the first time series information constituting the pair based on the second pattern corresponding to the pair, and
  wherein a time corresponding to each data contained in the first data is different from a time corresponding to the additional data.

2. The information use frequency prediction program according to claim 1, wherein the temporal operation unit performs the temporal operation, with regard to all combinations of a plurality of first time series information belonging to a first group, and a plurality of second time series information belonging to a second group.

3. The information use frequency prediction program according to 2, which causes a computer to function as sod unit which sorts a plurality of prediction results in the prediction unit, by using the use frequency as a key.

4. The information use frequency prediction program according to claim 1, wherein the temporal operation unit shifts the second time series information, sequentially on the time base in a unit of the predetermined time, based on the first time series information.

5. The information use frequency prediction program according to claim 1, wherein the temporal operation unit expands or contracts the second time series information time wise, sequentially, in a unit of predetermined expansion and contraction, based on the first time series information.

6. The information use frequency prediction program according to claim 1, wherein the temporal operation unit shifts the second time series information, sequentially on the time base in a unit of the predetermined time, and expands and contracts the shifted second time series information time wise, sequentially, in a unit of predetermined expansion and contraction, based on the first time series information.

7. The information use frequency prediction program according to claim 1, wherein the first time series information and the second time series information are time series information of use frequency of keywords in a keyword search engine on the Internet.

8. The information use frequency prediction program according to claim 1, wherein the first time series information and the second time series information are collected via different collection routes.

9. The information use frequency prediction program according to claim 1, wherein the first time series information and the second time series information are collected via the same collection route, and the collected time series information is grouped into two.

10. An information use frequency prediction apparatus, comprising:
  a temporal operation unit which sequentially performs temporal operations in a unit of predetermined times, the temporal operations being performed with respect to a relative relation between a first pattern of a first data including use frequency based on first time series information that represents a temporal change of the use frequency of the first time series information of the first data, and a second pattern of a second data including use frequency of second time series information that represents a temporal change of the use frequency of the second time series information based on the second data;
  a correlation coefficient calculation unit which calculates a correlation coefficient between the first time series information and the second time series information for each unit of the predetermined times based on the relative relation between the first and second patterns;
  a pair specifying unit which specifies a pair of the first time series information and the second time series information, corresponding to the correlation coefficient having the highest value, of a plurality of correlation coefficients calculated by the correlation coefficient calculation unit; and
  a prediction unit which predicts additional data of the use frequency of the first time series information constituting the pair based on the second pattern corresponding to the pair, and wherein a time corresponding to each data contained in the first data is different from a time corresponding to the additional data.

11. The information use frequency prediction apparatus according to claim 10, wherein the temporal operation unit shifts the second time series information on the time base, sequentially, in a unit of predetermined time, based on the first time series information.

12. The information use frequency prediction apparatus according to claim 10, wherein the temporal operation unit expands or contracts the second time series information time wise, sequentially, in a unit of predetermined expansion and contraction, based on the first time series information.

13. An information use frequency prediction method, comprising:

sequentially performs temporal operations in a unit of predetermined times, the temporal operations being performed with respect to a relative relation between a first pattern of a first data including use frequency based on first time series information that represents a temporal change of the use frequency of the first time series information of the first data, and a second pattern of a second data including use frequency of second time series information that represents a temporal change of the use frequency of the second time series information based on the second data;

calculation unit which calculates a correlation coefficient between the first time series information and the second time series information for each unit of the predetermined times based on the relative relation between the first and second patterns;

specifies a pair of the first time series information and the second time series information, corresponding to the correlation coefficient having the highest value, of a plurality of correlation coefficients calculated by the correlation coefficient calculation unit; and predicts additional data of the use frequency of the first time series information constituting the pair based on the second pattern corresponding to the pair, and wherein a time corresponding to each data contained in the first data is different from a time corresponding to the additional data.

14. The information use frequency prediction method according to claim 13, wherein in the temporal operation step, the second time series information is shifted on the time base, sequentially, in a unit of predetermined time, based on the first time series information.

15. The information use frequency prediction method according to claim 13, wherein in the temporal operation step, the second time series information is expanded or contracted time wise, sequentially, in a unit of predetermined expansion and contraction, based on the first time series information.

* * * * *

UNITED STATES PATENT AND TRADEMARK OFFICE
CERTIFICATE OF CORRECTION

PATENT NO. : 6,873,983 B2
DATED : March 29, 2005
INVENTOR(S) : Ugai et al.

It is certified that error appears in the above-identified patent and that said Letters Patent is hereby corrected as shown below:

Column 17,
Line 50, change "sense" to -- series --;

Column 18,
Line 8, change "according to 2" to -- according to claim 2 --.

Signed and Sealed this

Fifteenth Day of November, 2005

JON W. DUDAS
*Director of the United States Patent and Trademark Office*